US011937551B2

(12) United States Patent
van Roje

(10) Patent No.: US 11,937,551 B2
(45) Date of Patent: Mar. 26, 2024

(54) TWINE KNOTTER AND BALE PRESS WITH A TWINE KNOTTER

(71) Applicant: Maschinenfabrik Bernard Krone GmbH & Co. KG, Spelle (DE)

(72) Inventor: Lukas van Roje, Freren (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 339 days.

(21) Appl. No.: 17/392,290

(22) Filed: Aug. 3, 2021

(65) Prior Publication Data

US 2022/0030775 A1 Feb. 3, 2022

(30) Foreign Application Priority Data

Aug. 3, 2020 (DE) ...................... 10 2020 120 445.0

(51) Int. Cl.
*A01F 15/14* (2006.01)
*B65B 13/26* (2006.01)

(52) U.S. Cl.
CPC ............ *A01F 15/145* (2013.01); *B65B 13/26* (2013.01)

(58) Field of Classification Search
CPC ...... A01F 15/145; A01F 15/14; A01F 15/141; B65B 13/26; B65B 13/18; B65B 13/24
See application file for complete search history.

(56) References Cited

U.S. PATENT DOCUMENTS

| 661,882 | A | * | 11/1900 | Livesay et al. | ....... | A01F 15/145 |
| | | | | | | 289/13 |
| 2,815,233 | A | * | 12/1957 | Collins | ................. | A01F 15/145 |
| | | | | | | 289/13 |
| 2,926,599 | A | * | 3/1960 | Mcclellan | ............. | A01F 15/145 |
| | | | | | | 56/343 |
| 4,161,097 | A | | 7/1979 | Vansteelant | | |
| 7,296,828 | B2 | | 11/2007 | Schoonheere et al. | | |
| 9,736,989 | B2 | | 8/2017 | Verhaeghe et al. | | |
| 2004/0244607 | A1 | | 12/2004 | Corbin et al. | | |
| 2013/0118366 | A1 | * | 5/2013 | Esau | ................... | A01F 15/0858 |
| | | | | | | 100/33 R |
| 2015/0272011 | A1 | | 10/2015 | Demon | | |
| 2020/0178471 | A1 | | 6/2020 | Brown, Jr. et al. | | |

FOREIGN PATENT DOCUMENTS

| DE | 1 231 947 | 1/1967 |
| EP | 2 496 070 | 9/2012 |
| GB | 146525 | 9/1921 |
| GB | 1137825 | 12/1968 |

* cited by examiner

*Primary Examiner* — Ismael Izaguirre
(74) *Attorney, Agent, or Firm* — Gudrun E. Huckett

(57) ABSTRACT

A twine knotter for a bale press for forming two sequential knots for holding together a tying agent surrounding a crop bale includes a knotter frame and a knotter hook supported rotatably in the knotter frame and provided for knotting together ends of the tying agent. A holding arrangement has a twine holding disk rotatably supported at the knotter frame and conveying temporarily two tying agent strands of the tying agent. A knotter disk that is rotatingly driven is provided with a first drive element driving the knotter hook and a second drive element driving the twine holding disk. A stripper lever is provided to strip off knots from the knotter hook. A knife blade is provided to cut through tying agent strands. The twine holding disk upon rotation is guided along the knife blade so that the tying agent strands are cut through upon passing the knife blade.

13 Claims, 19 Drawing Sheets

TWINE KNOTTER AND BALE PRESS WITH A TWINE KNOTTER

BACKGROUND OF THE INVENTION

The present invention concerns a twine knotter for producing knots of a tying agent in the manner of a tying twine that surrounds a crop bale. The twine knotters concerned here form one of the component groups that are used in bale presses with a cuboid-shaped press channel that serve to knot the tying material surrounding a crop bale at the end of a bale producing process so that the finished crop bale after ejection from the press channel does not fall apart again. In practice, numerous embodiments of twine knotters installed in such bale presses are known.

EP 2 496 070 B1 discloses a twine knotter unit for producing two immediately sequentially arranged knots that hold together a tying agent strand surrounding a crop bale. For producing the knots that hold together a tying agent strand, the twine knotters are comprised of a knotter drive disk supported on a drivable knotter drive shaft as well as a knotter chassis also supported on the knotter drive shaft, wherein the knotter chassis forms the receiving unit for the knotter component group that is comprised of knotter hook, knife lever, and twine holder. In the here disclosed knotter component group, it becomes apparent that, for cutting through the tying agent strands, a knife lever is used that is moved, controlled by the knotter drive disk, toward the tying agent strands that are clamped in the twine holder and are cut through in doing so. In this immediately sequential production of two knots, it is apparent that the tying agent strand that is in the region of the twine holder is cut twice so that for each production of two immediately sequentially arranged knots a twine rest is produced that is either causing contamination of the feed for feeding or soiling of the environment when these twine rests fall onto the ground of the field after production of the knots.

Object of the invention is therefore to provide a twine knotter and a bale press with such a twine knotter in which the generation of twine rests during the production of two immediately sequentially arranged knots is reliably avoided, wherein the important functional component groups of a twine knotter according to the prior art are kept.

SUMMARY OF THE INVENTION

This object is solved with a twine knotter for a bale press for forming two sequential knots for holding together a tying agent surrounding a crop bale,
  with a knotter hook, which is supported rotatably in a knotter frame, for knotting the ends of the tying agent,
  with a holding arrangement comprising a twine holding disk, wherein the twine holding disk is supported rotatably at the knotter frame and is provided for temporary conveyance of two tying agent strands of the tying agent,
  with a knotter disk which is driveable rotatingly, at which for each one of the knots a first drive means for driving the knotter hook are arranged, respectively, and at which at least a second drive means for driving the twine holding disk are arranged;
  with a stripper lever for stripping the knots from the knotter hook, and
  with a knife blade, which is held in the twine knotter, for cutting through the tying agent strands,
  characterized in that the twine holding disk upon rotation is guided along the knife blade so that the tying agent strands are cut through upon passing the knife blade.

This object is solved with a bale press with a plurality of twine knotters according to the present invention.

This object is solved with a method for forming two sequential knots for holding together a tying agent surrounding a crop bale, wherein the tying agent strands are cut through between the first and the second knot, and wherein the twine holding disk, prior to finishing the second knot, is stopped before the tying agent strands pass the knife blade.

Advantageous embodiments of the invention can be taken from the dependent claims.

According to the invention, a twine knotter for a bale press is proposed for forming two sequential knots for tying together a tying agent surrounding a crop bale, which is provided with a knotter hook, which is rotatably supported in a knotter frame, for knotting the ends of the tying agent; with a holding arrangement comprising a twine holding disk, wherein the twine holding disk is rotatably supported at the knotter frame and is provided for temporary conveyance of two tying agent strands of the tying agent; with a knotter disk driveable rotatingly at which for each one of the knots a first drive means for driving the knotter hook is arranged, respectively, and at which at least a second drive means for driving the twine holding disk is arranged; with a stripper lever for stripping the knots from the knotter hook; and with a knife blade for cutting through the tying agent strands which is held in the twine knotter, wherein the twine holding disk upon rotation is guided along the knife blade so that the tying agent strands are cut through upon passing the knife blade.

The invention provides thus a twine knotter for a bale press which in an advantageous manner maintains the essential functional component groups of the knotter and, with only minimal expenditures at only a few components, avoids the generation of twine rests during production of two immediately sequentially arranged knots.

Since the position of the knife blade is selected such that the tying agent strands by rotation of the twine holding disk are being passed along the knife blade and are cut through in the process, the tying process can be done such that only a single cut of the tying agent strands is carried out between the production of the first and the second knot. Moreover, the twine holding disk is stopped shortly before completion of the second knot before a second cut is realized. In this way, no tying agent rests are produced when producing the two knots.

So that during the production of the second one of the immediately sequentially arranged knots no cut through the tying agent strands is carried out, it is provided in an advantageous manner that the twine knotter has correlated therewith a knife blade that is substantially stationarily arranged in the twine knotter. This means that the knife blade is not moved for cutting through the tying agent strands. The cutting process of the tying agent strand is instead started in that the twine holding disk with the tying agent strands clamped in a recess is rotated toward the knife blade so that in this way the tying agent strands are cut off. In a preferred embodiment, it is provided that the knife blade is attached at a twine clamping lever that is interacting with the twine holding disk. In this context, it should be noted that the twine clamping lever interacting with the twine holding disk is changed only insignificantly in its position due to the clamped tying agent so that the position of the knife blade relative to the twine holding disk remains essentially unchanged. In a further advantageous embodiment, it is conceivable to attach the knife blade at the knotter frame so that in this way a stationary arrangement in the twine knotter is achieved.

In a preferred embodiment, for this purpose a stripper lever with a puller for pulling out the tying agent strands, comprising a lower thread and an upper thread, from one of the recesses of the twine holding disk of the twine knotter is provided at the twine knotter.

Pulling out the tying agent strands from which the second one of the immediately sequentially arranged knots is formed is carried out in accordance with the invention shortly before the final completion of this second knot. In this way, cutting off the parts of the tying agent strands that are located at a backside of the twine holding disk between the recess receiving the tying agent strands for the first knot and the recess for receiving the tying agent strands for the second knot is safely avoided.

In a further embodiment of the twine knotter, it is provided that a holding arrangement comprises a twine clamping lever wherein the twine clamping lever interacts with the twine holding disk in order to secure the tying agent strands in a recess of the twine holding disk. In this context, the twine holding disk comprises at least one pair of two recesses which are arranged rotated relative to each other, in relation to a rotational movement of the twine holding disk in rotational direction about a twine holding disk axis, by a displacement angle of greater 90° opposite to the clockwise direction. A first recess of this pair of recesses serves now to receive the tying agent strands supplied by a tying needle to the twine knotter for forming the first one of the immediately sequentially arranged knots while the second recess of this pair which is arranged rotated by the displacement angle serves for receiving the tying agent strands for the second one of the immediately sequentially arranged knots. In an advantageous further embodiment of the invention, the twine holding disk can have correlated therewith two pairs with two recesses, respectively, wherein these two pairs of recesses are arranged rotated by 180° relative to each other.

A preferred embodiment of the twine knotter comprises at least a second drive means that is correlated with the knotter disk. In a first advantageous embodiment, a tooth segment as a second drive means is provided at the knotter disk for an uninterrupted drive action of the twine holding disk. In this context, the twine holding disk is rotated about a rotational angle of 180°. This means that the recesses at the twine holding disk from a position, in which the tying agent strands for the first knot are received, are rotated into a position, in which the tying agent strands for the second knot are received, and then still farther until the corresponding recess with the clamped tying agent strands for the second knot are stopped in front of the knife blade. In a further conceivable embodiment for the drive action of the twine holding disk, it is provided to correlate with the knotter disk two second drive means embodied as tooth segments which however first effect a first rotational movement at the twine holding disk and then, after a temporal interruption of the drive movement of the twine holding disk, cause it to carry out a further rotational movement. Both rotational movements together extend however in this context also across an angle of rotation of 180°.

In a further advantageous embodiment of the invention, it is provided to assign to the twine knotter a knotter hook which comprises, between two stationary clamping wings provided for forming a tying agent loop during the knot forming process, a gap that assist in stripping the knots from the clamping wings at the end of the respective knot forming process. In order to form the tying agent loop, the two tying agent strands upon rotation of the knotter hook are placed around the latter. The tying agent loop comprises therefore both tying agent strands. Preferably, this knotter hook is designed such in this context that, in relation to a second spatial direction, a pivotable clamping wing with a projection that is extending into the gap is located between the stationary clamping wings and is configured to terminate the knot forming process in that the cut-off free ends or the free ends of the tying agent strands, pulled out from a recess of the twine holding disk by the stripper lever of the twine knotter, upon stripping off the tying agent loop from the stationary clamping wings of the knotter hook are pulled into the tying agent loop by means of the projection. Pulling tight the tying agent loop terminates the knot forming process. Already upon pulling tight the tying agent loop, the knot is pulled through the gap between the stationary clamping wings in the direction of the crop bale and leaves in this way the region of the twine knotter.

An advantageous configuration of the gap between the stationary clamping wings of the twine knotter comprises a keyhole-type shape.

The object of the invention is furthermore solved by a bale press that is furnished with a plurality of twine knotters according to the invention, in addition to the functional component groups known from the prior art such as a receiving device for receiving the crop to be pressed, a conveying and cutting device for conveying the crop into a preferably cuboid-shaped press channel in which a reciprocatingly driven press piston provides for compression of the crop. The number of twine knotters installed in a bale press depends, for example, on the bale width of the crop bale but also on the required compression of the crop in the crop bale.

The object of the invention is furthermore solved by a method in which, for forming two sequential knots for holding together a tying agent surrounding a crop bale, between a first and a second knot the tying agent strands are cut through and the twine holding disk, before the tying agent strands pass the knife blade, is stopped prior to completion of the second knot.

In the following, the invention will be explained with the aid of Figures. The Figures are to be understood only as examples and do not limit the general concept of the invention.

BRIEF DESCRIPTION OF THE DRAWINGS

FIG. 3b shows a twine holding disk for the twine knotter of FIG. 3a.

DESCRIPTION OF PREFERRED EMBODIMENTS

Figure 1A:
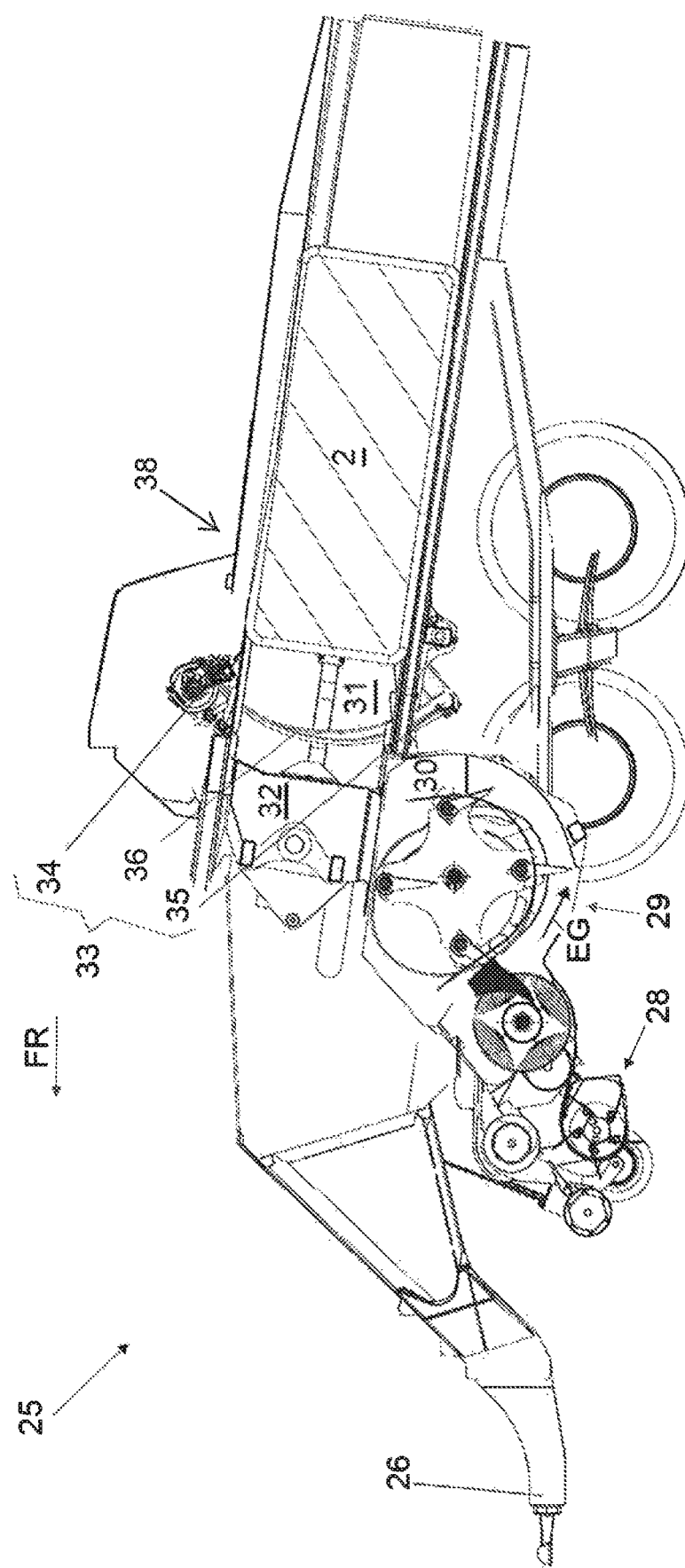
FIG. 1a shows schematically a bale press and FIG. 1b a knotter arrangement for the bale press of FIG. 1a with a plurality of twine knotters.

FIG. 1*a* shows schematically a bale press 25, here a square bale press. In the following, the terms bale press 25 and square bale press are used synonymously.

The bale press 25 is configured to be pulled behind a tractor (not illustrated). It comprises for this purpose a trailer coupling 26 at the front in travel direction FR. The invention is however also usable in self-propelled bale presses.

The bale press 25 comprises as a receiving device 28 a pick-up for picking up crop from the ground 27. The crop is supplied to a cutting device (not identified) that is arranged downstream of the pick-up device 28 in a crop flow direction EG. After cutting, it is supplied to a conveying and collecting device 29 which is provided for collecting and pre-compressing the crop. The conveying and collecting device 29 comprises for this purpose a collecting chamber 30. In crop flow direction EG downstream thereof, a press channel 31 is provided. With sufficient pre-compression of the crop, it is conveyed by means of a rake that is configured as a feed rake (not identified) of the conveying and collecting device 29 into the press channel 31. Here, it is pressed to a square bale 2 by means of a pressing piston 32 which is cyclically reciprocated in the press channel 31.

The square bale press 25 comprises a tying device 33 which is provided for tying the square bale 2 so that it does not fall apart anymore. For this purpose, the tying device 33 comprises a knotter arrangement 34 with a plurality of twine knotters 1 (see FIG. 1*b*). The twine knotters 1 are each provided for knotting tying agent strands 4.1, 4.2 of a thread-shaped tying agent, i.e., an upper thread 4.1 and a lower thread 4.2, to each other to form a knot 3 (see FIG. 2*k*). The twine knotters 1 are arranged at a top side 38 of the bale press 25 above the press channel 31.

The term tying agent strand is used in the context of this invention synonymously for the upper thread 4.1 and the lower thread 4.2.

For supply of the upper threads 4.1, the tying device 22 comprises for each one of the twine knotters 1 an upper twine needle 47 (see FIGS. 2*a* to 2*k*). Moreover, the tying device 33 comprises a bottom twine guide 35 that is provided for guiding the lower threads 4.2. The bottom twine guide 35 is arranged below the press channel 31. It comprises for each one of the twine knotters 1 a respective bottom twine needle 36. Upon driving the bottom twine guide 35, the bottom twine needles 35 and therewith the lower threads 4.2 are guided respectively to the twine knotter 1 correlated with them.

A crop bale 2 is tied when a nominal value for a bale length has been reached or surpassed.

Figure 1B:
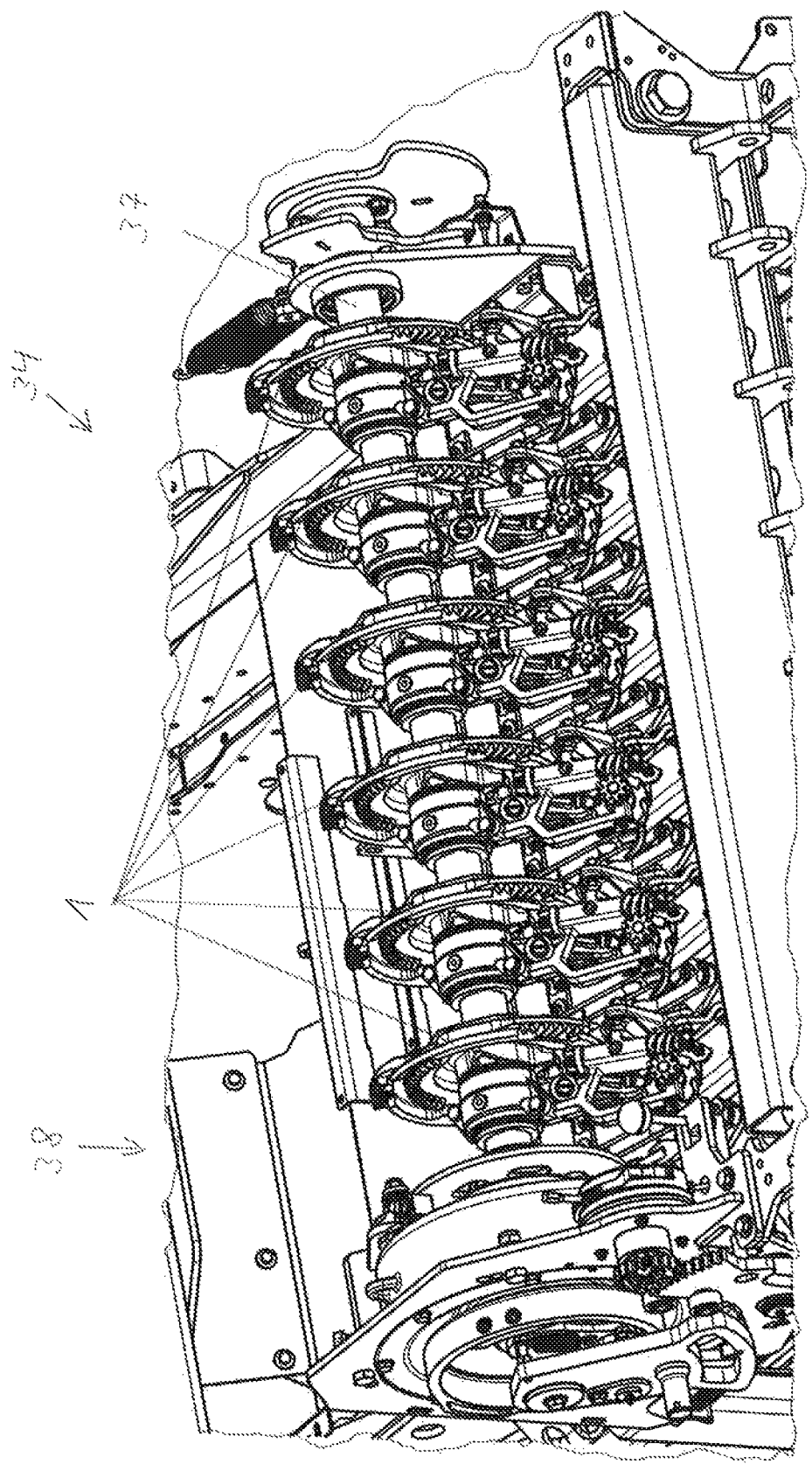

FIG. 1*b* shows the knotter arrangement 34 for the bale press 25 of FIG. 1*a*. The knotter arrangement 34 is arranged at the top side 38 of the bale press 25 and comprises the plurality of twine knotters 1. The twine knotters 1 are arranged spaced apart from each other along a knotter shaft 37.

Figure 2A:
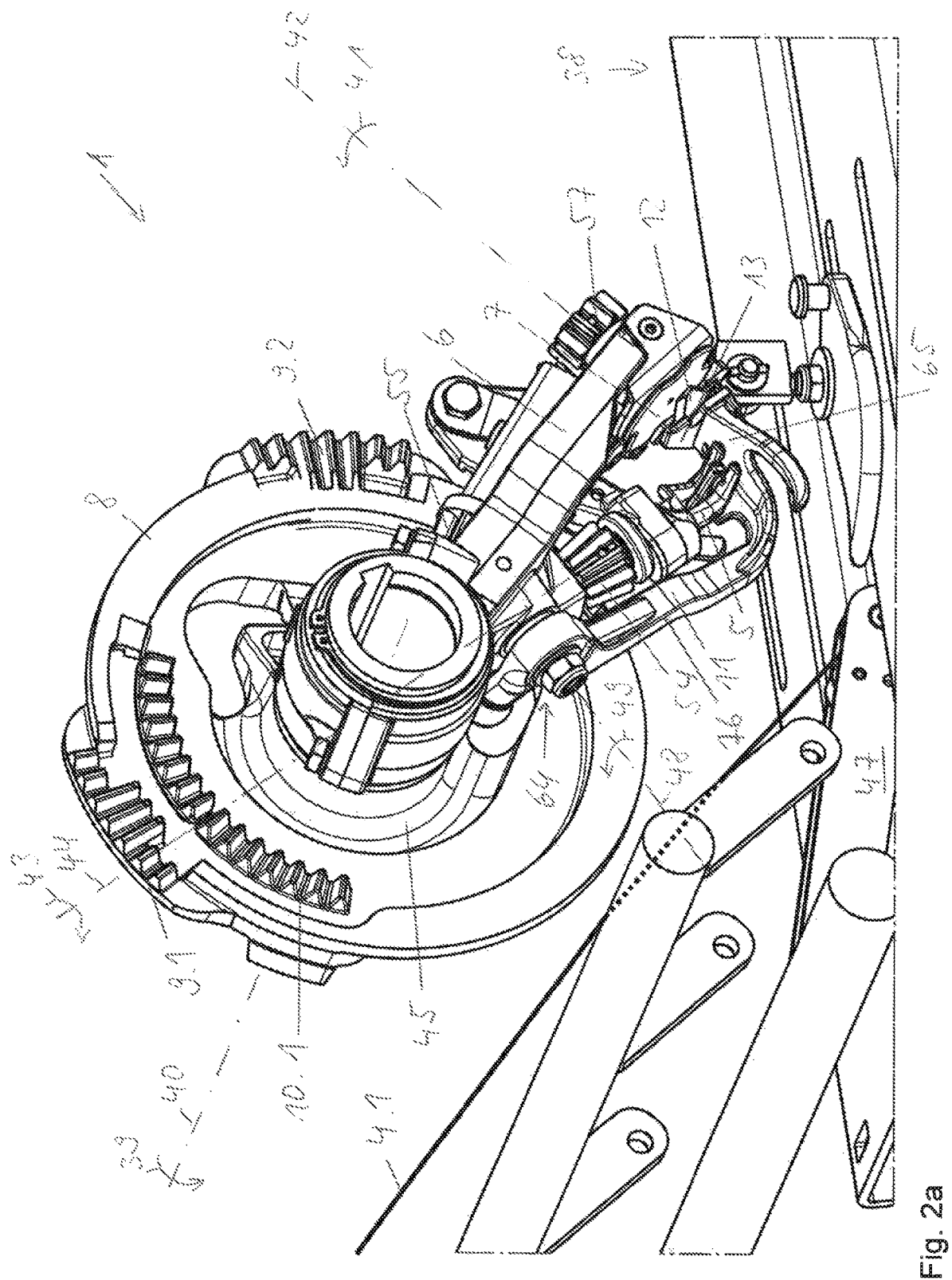
FIGS. 2a, 2b, 2c, 2d, 2e, 2f, 2g, 2h, 2i, 2j, 2k show respectively one of the twine knotters or an enlarged detail of the twine knotter of the knotter arrangement of FIG. 1b in a perspective view.
Figure 2B:
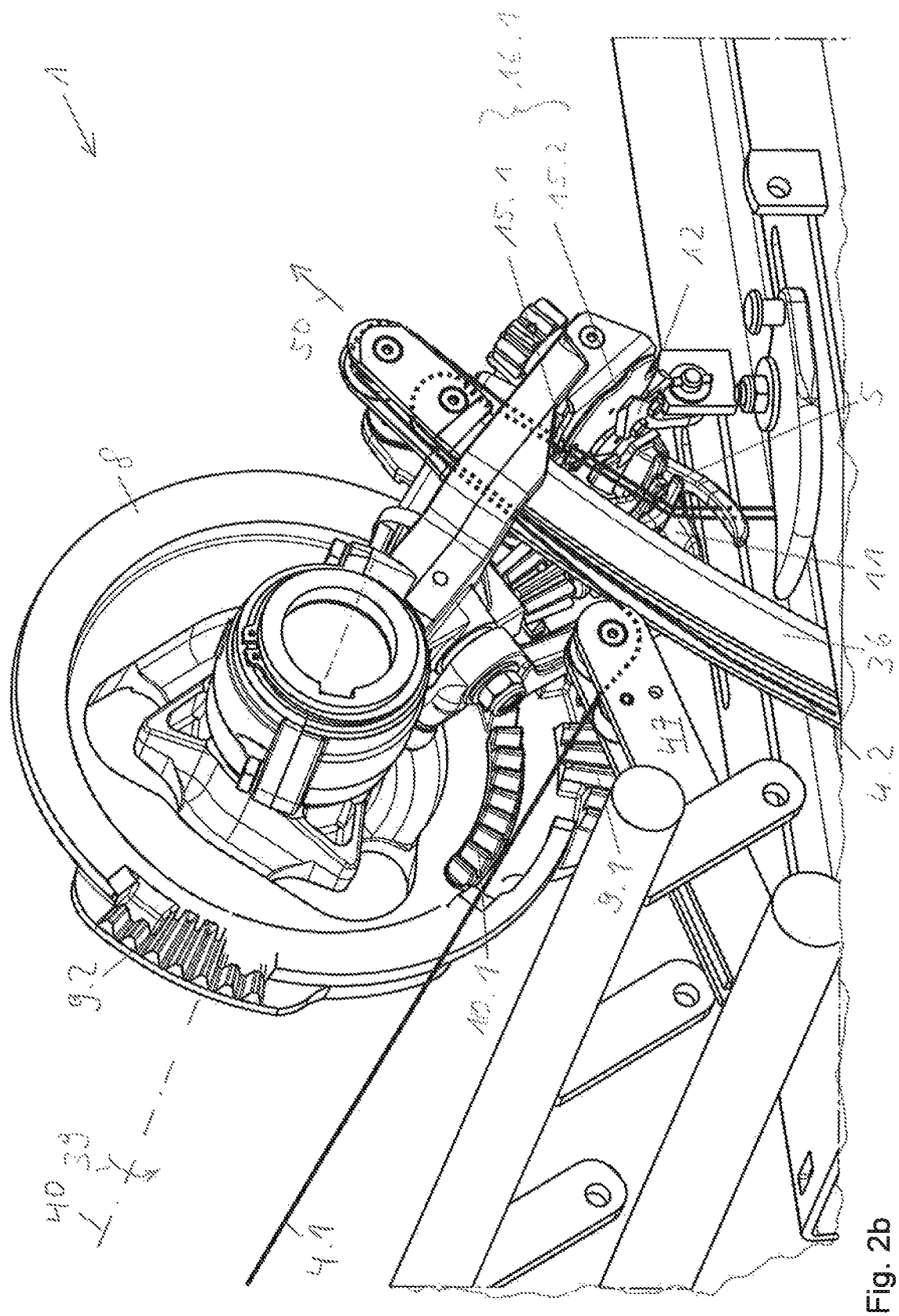
Figure 2C:
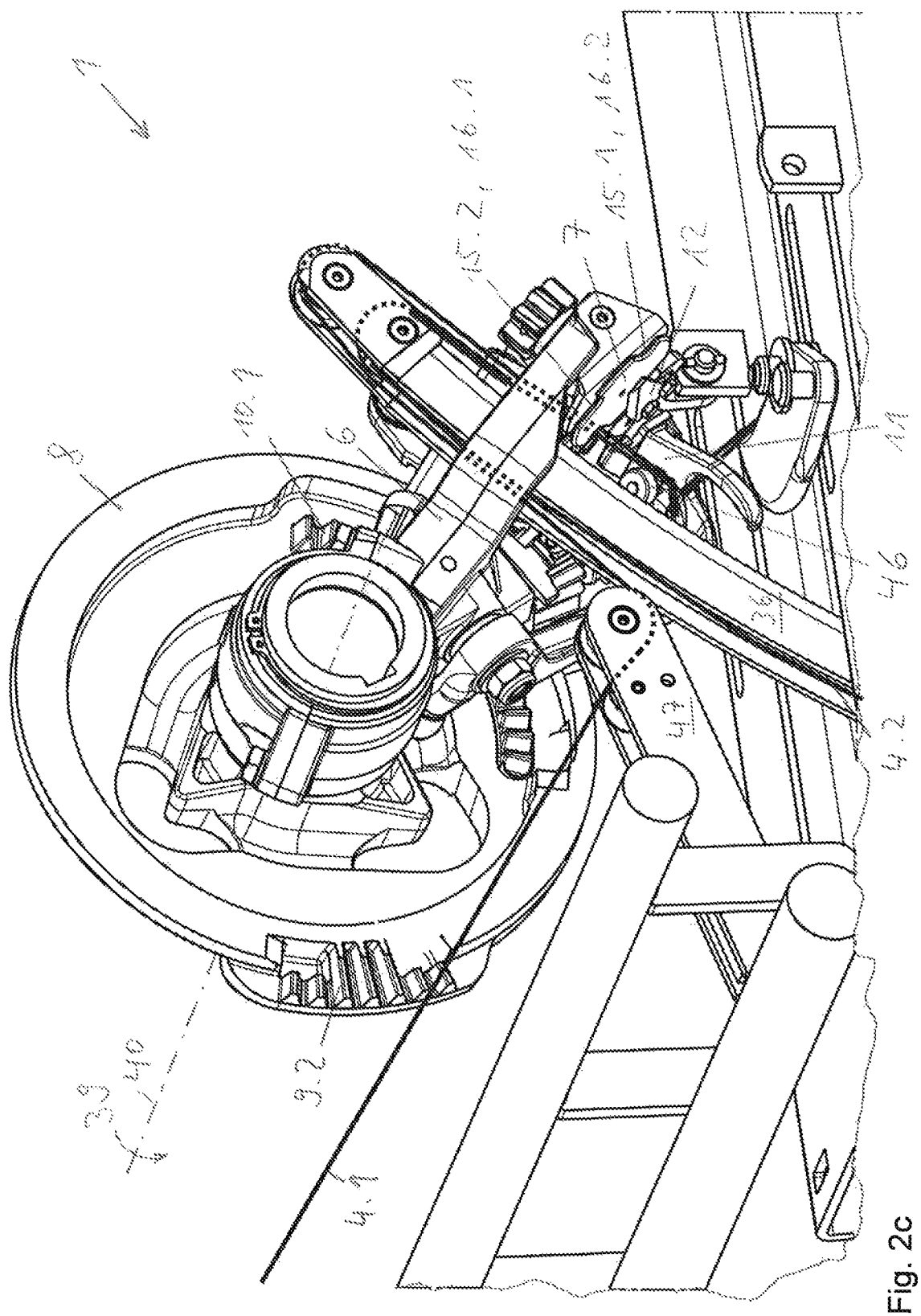
Figure 2D:
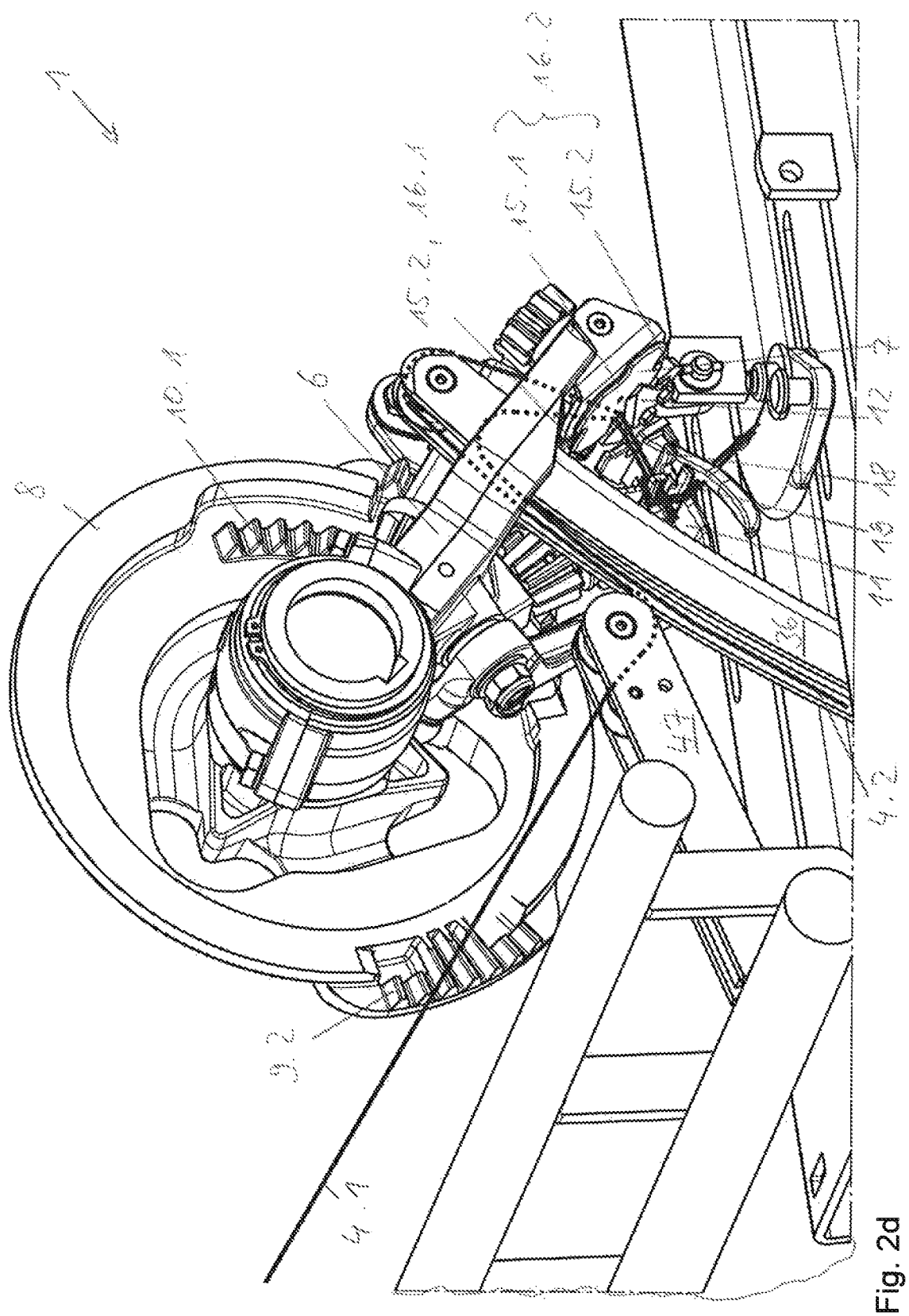
Figure 2E:
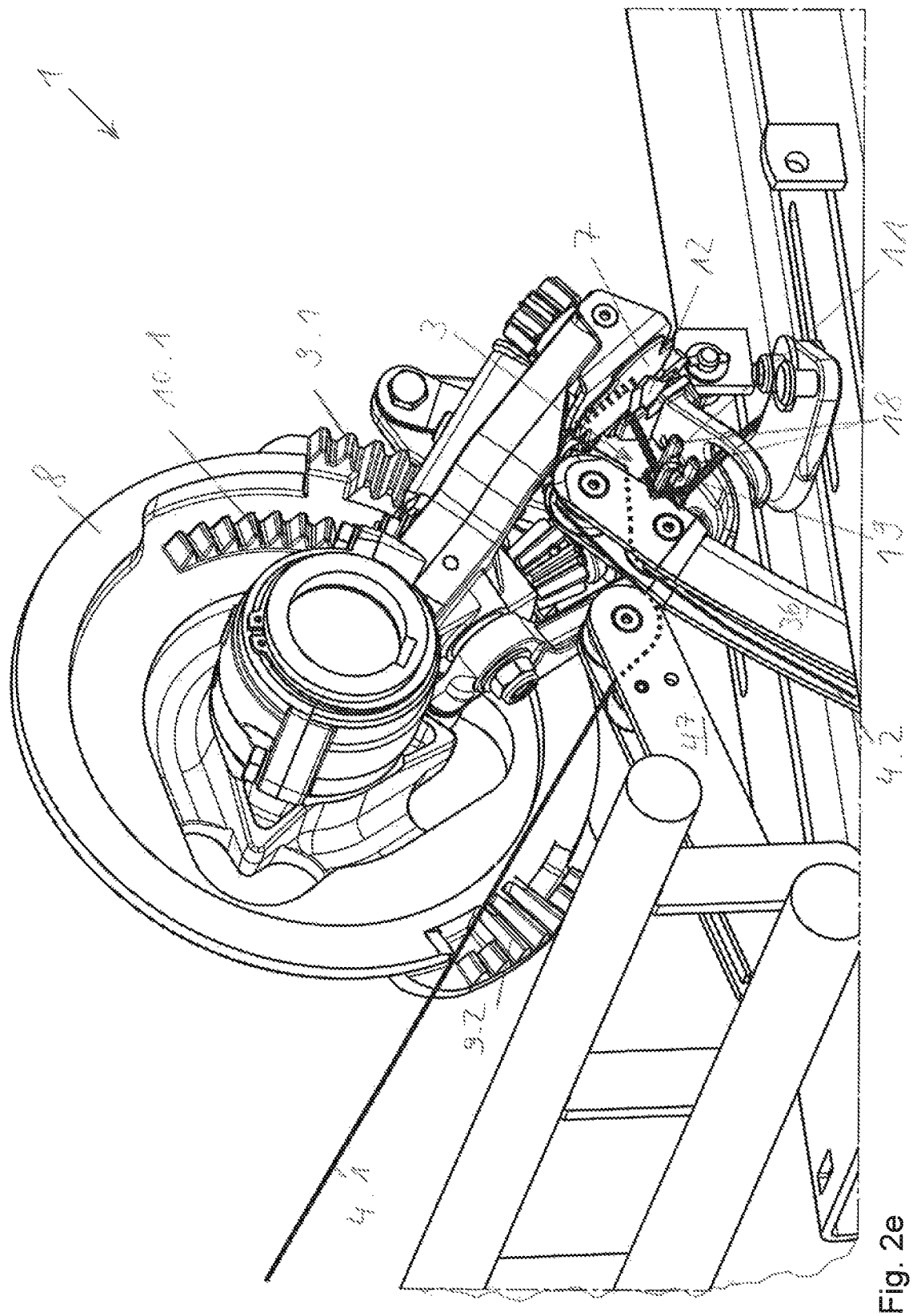
Figure 2F:
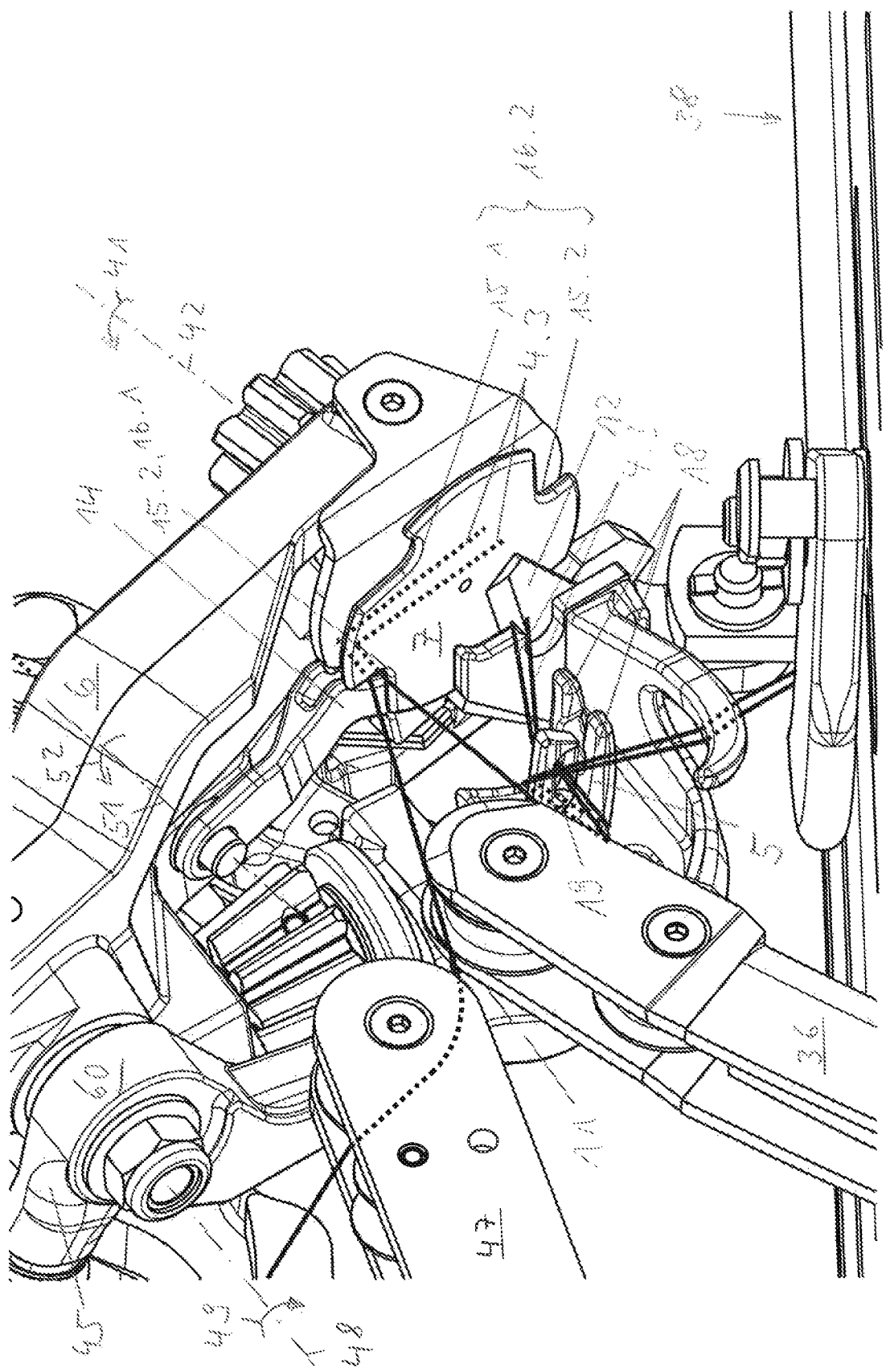
Figure 2G:
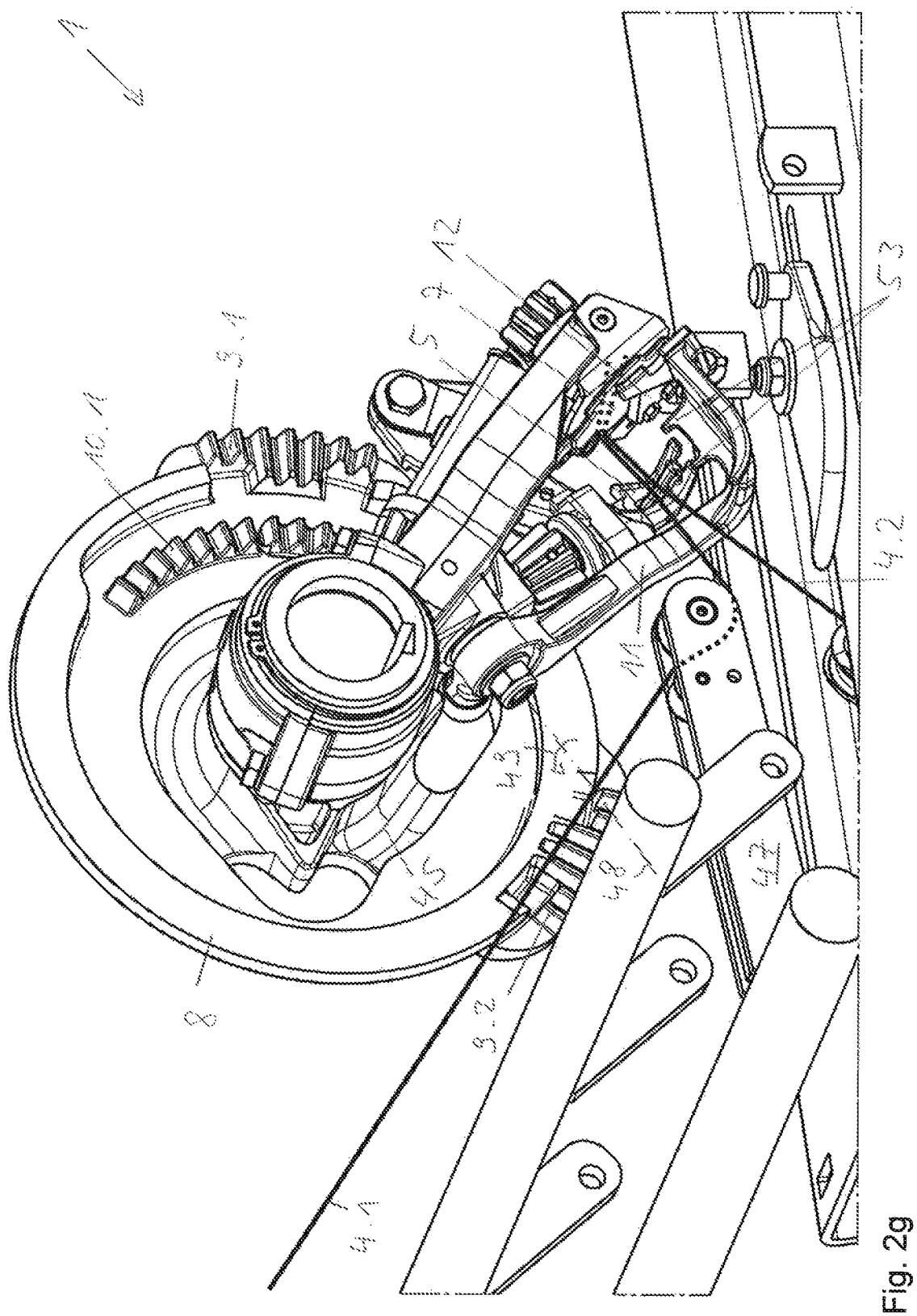
Figure 2H:
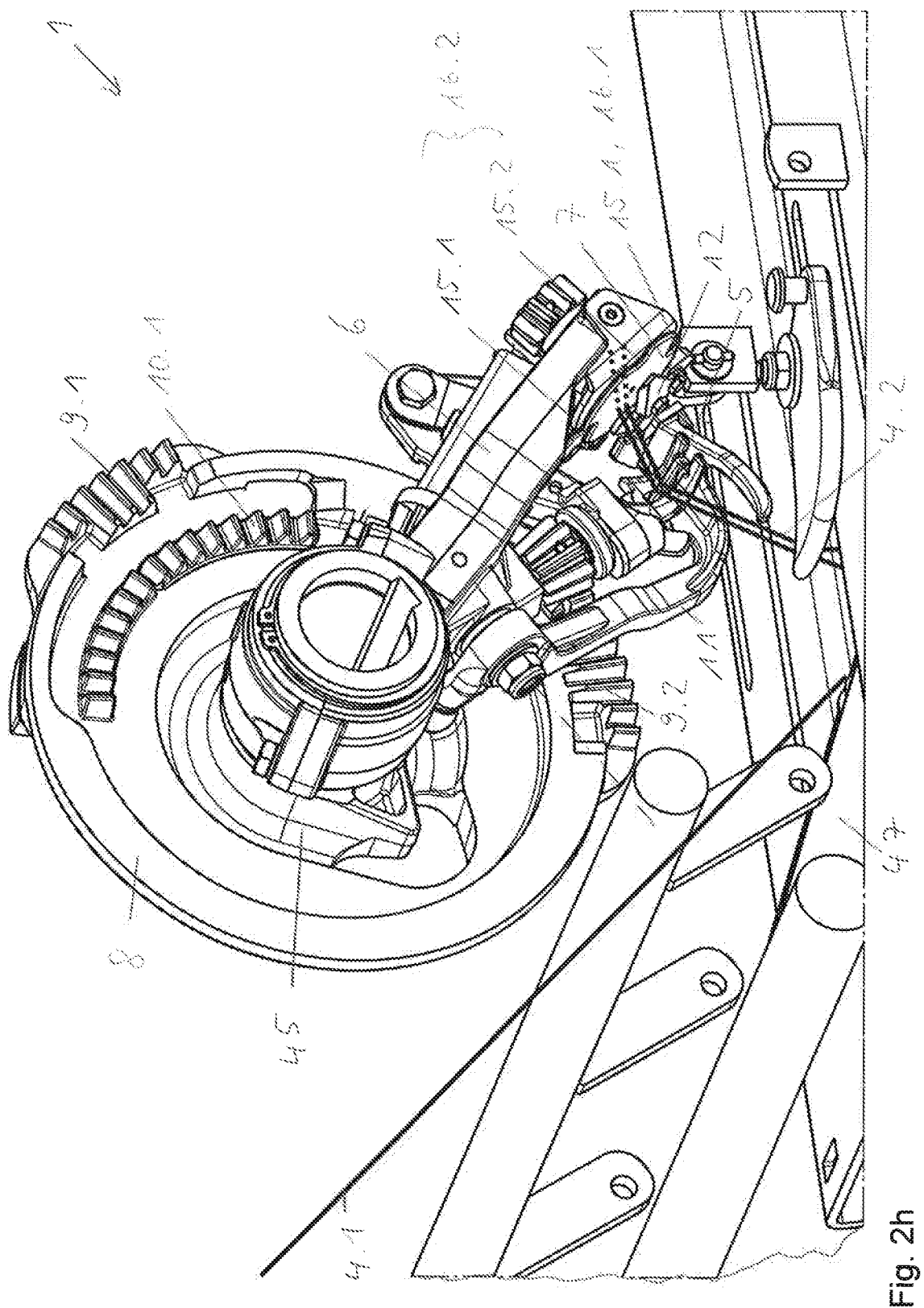
Figure 2I:
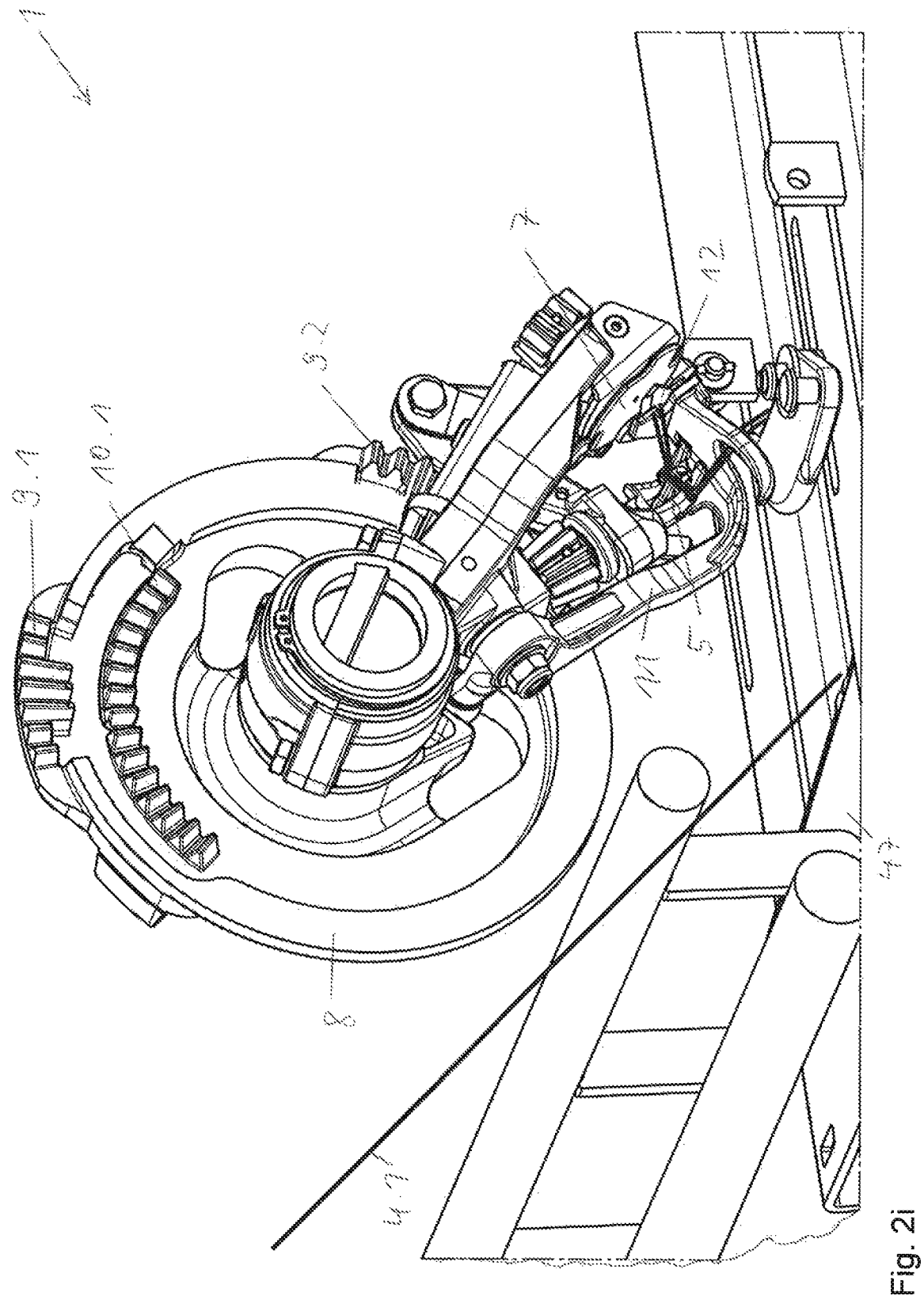
Figure 2J:
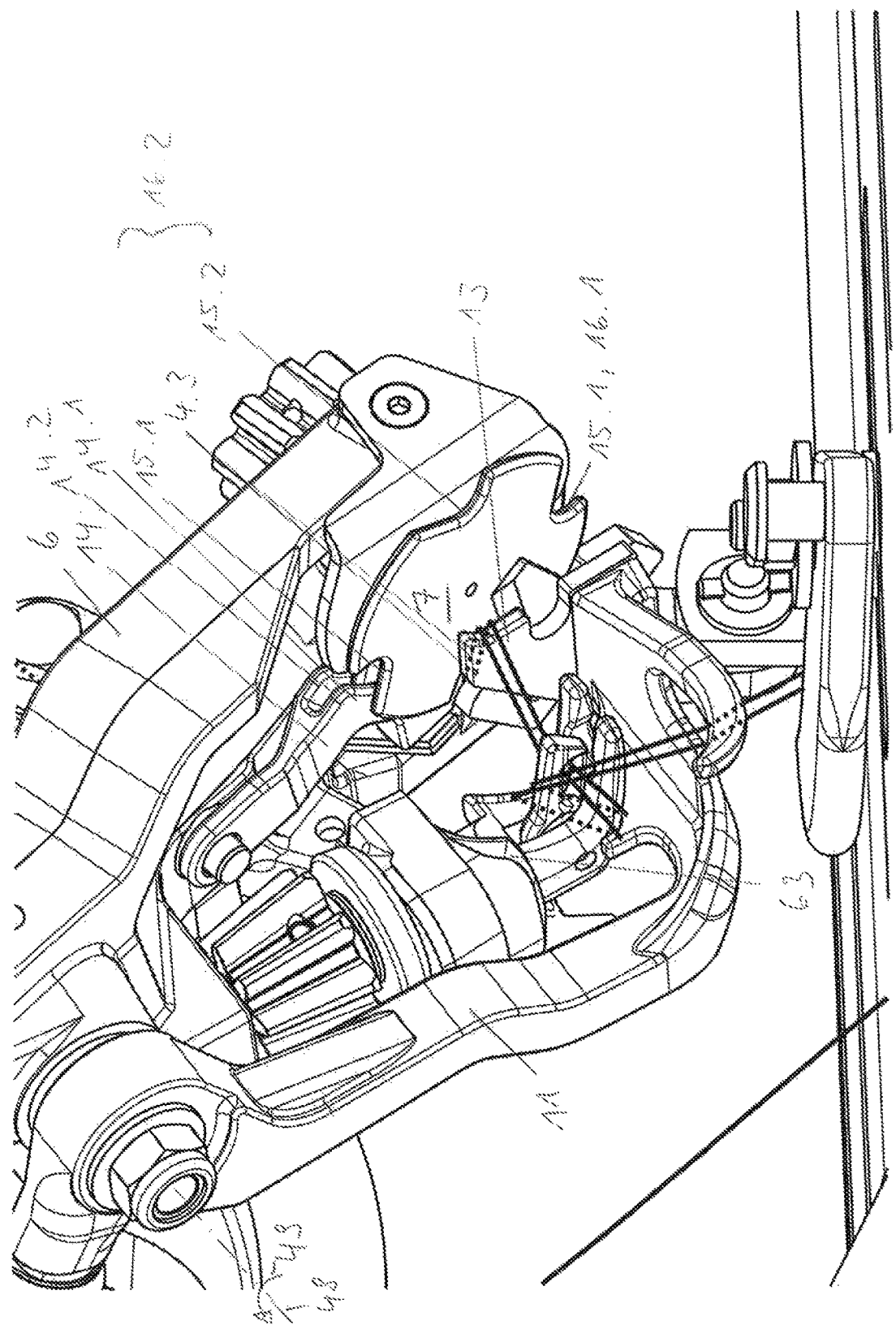

FIGS. 2*a*-2*k* show respectively one of the twine knotters 1 or a partial enlarged view of the twine knotter 1 of the knotter arrangement 34 of FIG. 1*b*. FIGS. 2*f* and 2*j* show the enlarged views.

The twine knotter 1 comprises a knotter disk 8 which is held fixedly on the knotter shaft 37. The knotter disk 8 rotates therefore upon driving the knotter shaft 37 together with latter. In addition, the twine knotter 1 comprises a knotter frame 6 which is arranged so as to rotate in relation to the knotter shaft 37 at the latter so that upon driving of the knotter shaft 37 it does not rotate therewith and is arranged stationarily in the bale press 25.

FIGS. 2*a*-2*e*, 2*g*-2*i*, and 2*k* show the twine knotter 1 in the same perspective view, respectively, in different drive states that it is subjected to upon driving of the knotter shaft 37, wherein the drive states differ by a rotational angle (not identified) from each other about which the knotter disk 8 has been rotated together with it relative to a zero position. FIG. 2*f* shows an enlarged detail of FIG. 2*e* and FIG. 2*j* shows an enlarged detail of FIG. 2*i*, wherein FIG. 2*f* and FIG. 2*j* each show a further perspective view. FIG. 3*a* shows an enlarged detail of the twine knotter 1 of FIGS. 2*a*-2*k* without the tying agent strands 4.1, 4.2 at a rotational angle of approximately 320°.

The twine knotter 1 is configured to form two sequential knots 3 that are provided for connecting the upper thread 4.1 and lower thread 4.2 of the tying agent surrounding the crop bale 2. It is thus a double knotter. The terms twine knotter 1 and double knotter are therefore used synonymously in the context of this invention.

The twine knotter 1 comprises for this purpose a knotter hook 54 for knotting the ends 4.3 of the tying agent 4.1, 4.2, which is supported in the knotter frame 6 so as to be rotatable about a knotter hook axis 44 in a knotter hook rotational direction 43.

Figure 3A:
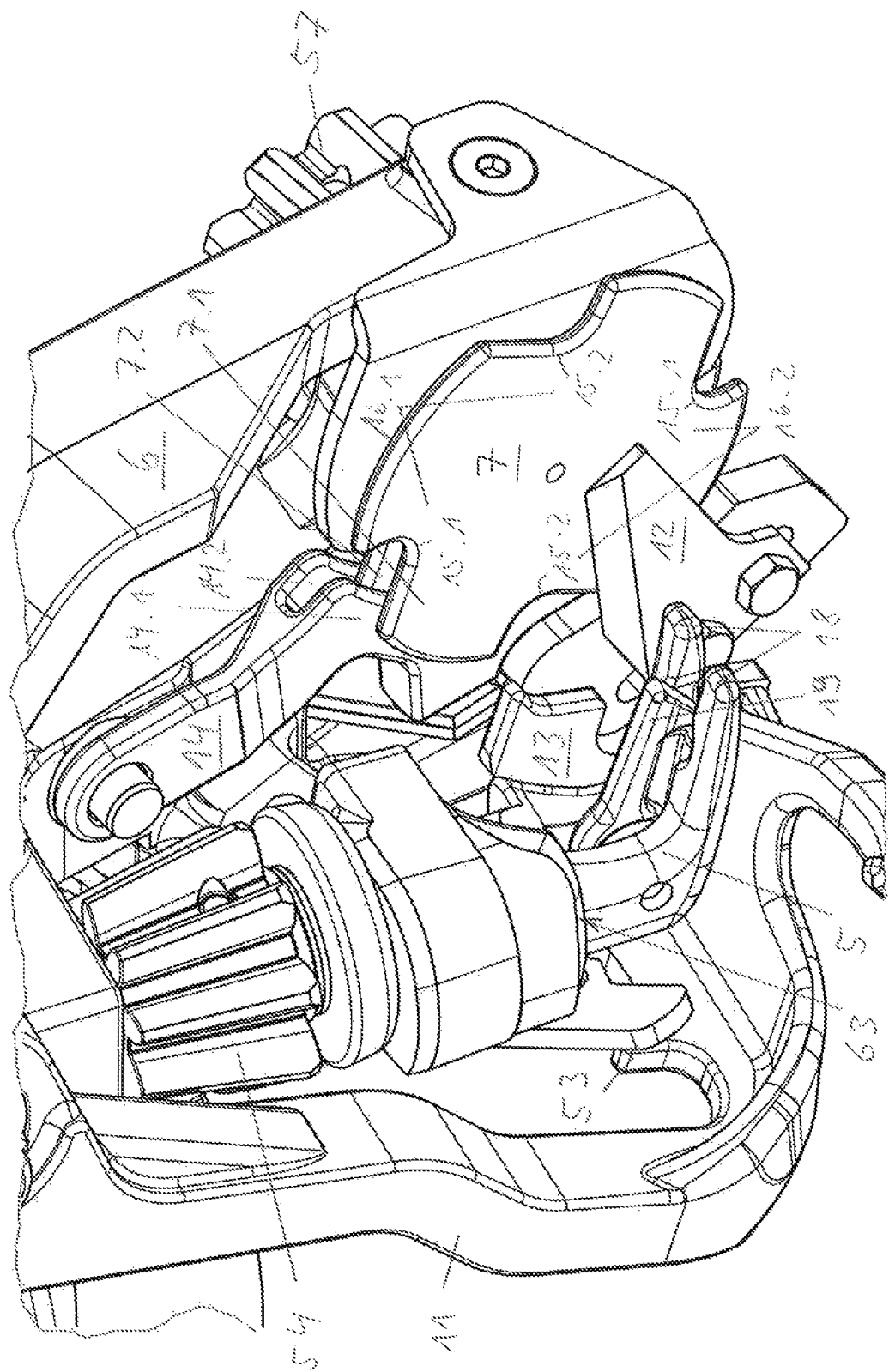
FIG. 3a shows an enlarged detail view of the twine knotter of FIG. 2a to FIG. 2k.
Figure 3B:
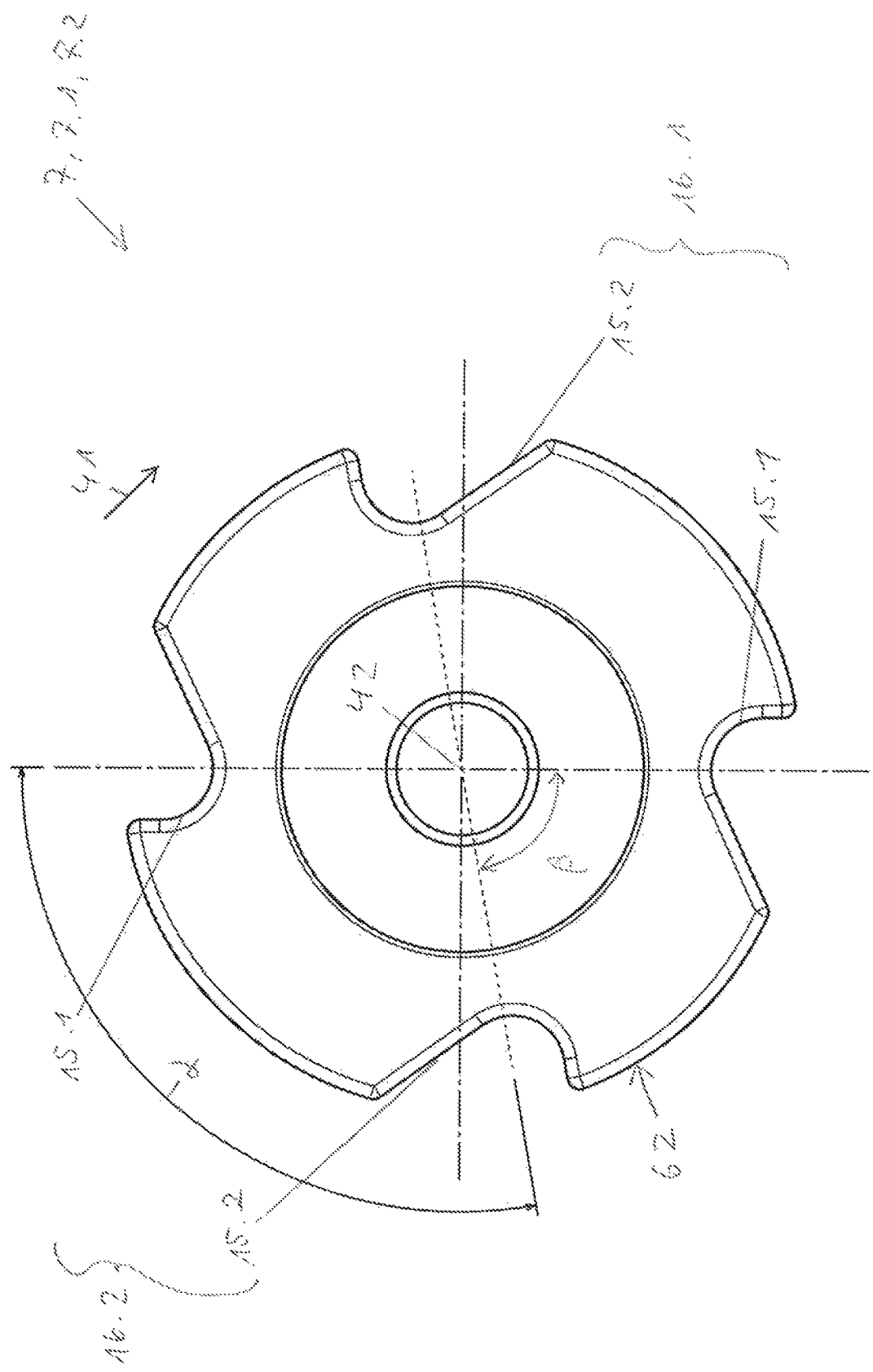
Figure 3C:
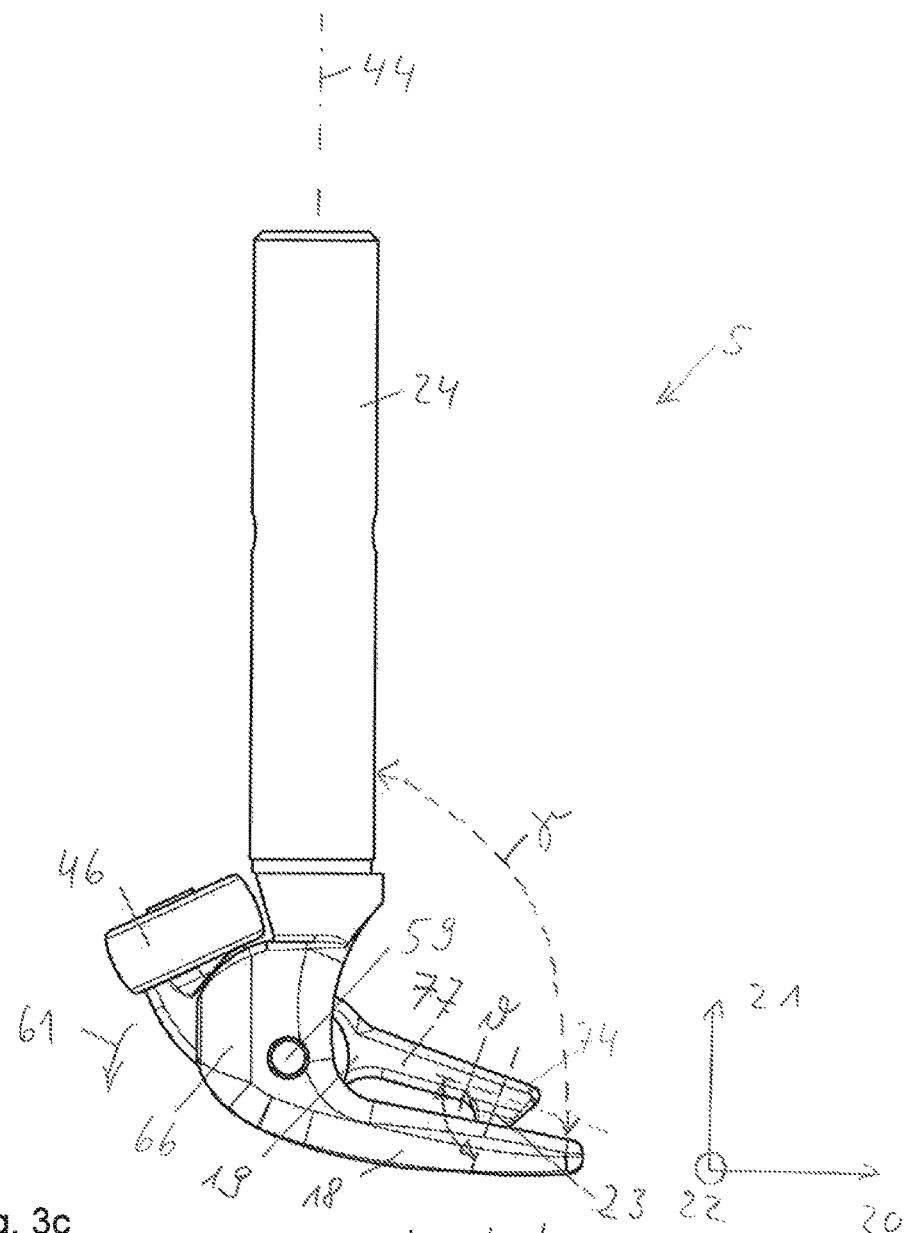
FIG. 3c shows a knotter hook for the twine knotter of FIG. 3a in a side view.
Figure 3D:
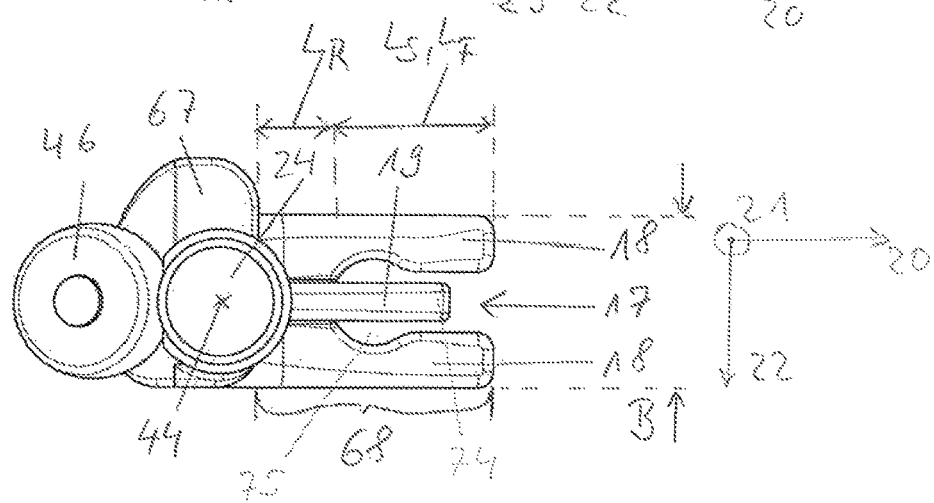
FIG. 3d shows a plan view of the knotter hook of FIG. 3c.

The knotter hook 5 is separately illustrated in FIGS. 3*c* and 3*d*. It comprises two stationary clamping wings 18 that are spaced apart from each other in a third spatial direction 22 and comprise a length extension component (not illustrated) in a first spatial direction 20. In this context, the third spatial direction 22 is arranged transversely to the first spatial direction 20. Between the stationary clamping wings 18, an approximately keyhole-shaped gap 17 is provided. In a second spatial direction 21, a pivotable clamping wing 19 is additionally arranged which is displaced in height direction relative to the stationary clamping wings 18. The second spatial direction 21 extends transversely to the first spatial direction 20 as well as transversely to the third spatial direction 22. The pivotable clamping wing 19 comprises a hook-shaped projection 20 that extends opposite to the second spatial direction 21 so that it is pointing in the direction toward the gap 17. In a closed state (not identified) shown in FIG. 3*c*, the projection 20 at least minimally projects into the gap 17. The pivotable clamping wing 19 is pivotably supported in a pivot wing bearing 59 that is arranged in the third spatial direction 22 above the stationary clamping wings 18.

For pivoting the pivotable clamping wing 19 from the closed state into an open state (not illustrated), the knotter hook 5 comprises a control roller 46 that upon rotation of the knotter hook 5 about the knotter hook axis 44 rolls along a control guide 63 (see FIG. 3*a*). The control roller 46 is arranged at side (not identified) of the knotter hook 5 that is facing away from the stationary clamping wings 18. It is fastened at the pivotable clamping wing 19 and is shaped such that the latter, in accordance with the contour of the control guide, is pivoted in and opposite to a wing pivot direction 61 when the control roller 46 rolls along the control guide. Upon pivoting of the pivotable clamping wing 19 in the wing pivot direction 61, it opens in relation to the stationary clamping wings 18. In this open state, the tying agent strands 4.1, 4.2 can be placed into the intermediate space (not identified) between the stationary clamping wings 18 and the pivotable clamping wing 19. Upon pivoting back from the open state into the closed state, the tying agent strands 4.1, 4.2 are clamped between the stationary clamping wings 18 and the pivotable clamping wing 19.

The twine knotter 1 comprises in addition a holding arrangement (not identified) which is provided for holding the tying agent strands 4.1, 4.2. The holding arrangement comprises a twine holding disk 7 which is supported at the knotter frame 6 so as to be rotatable about a twine holding disk axis 42 in a twine holding disk rotational direction 41. The twine holding disk 7 is provided for temporary conveyance of the two tying agent strands 4.1, 4.2 of the tying agent.

At its outer contour 62 (see FIG. 3c), it comprises at least a first pair 16.1 of two recesses 15.1, 15.2. In this context, each one of the two recesses 15.1, 15.2 is provided for receiving the tying agent strands 4.1, 4.2, respectively, when producing one of the two knots 3. In relation to a rotational movement of the twine holding disk 7 in twine holding disk rotational direction 41 about the twine holding disk axis 42, the recesses 15.1, 15.2 are arranged rotated relative to each other opposite to the clockwise direction by a displacement angle α that is greater than 90°. The earlier recess 15.1 in relation to the rotational movement in the twine holding disk rotational direction 41 is provided for receiving the tying agent strands 4.1, 4.2 for the first one of the two knots 3 and the later recess 15.2, in relation to the rotational movement in the twine holding disk rotational direction 41, is provided for receiving the tying agent strands 4.1, 4.2 for the second one of the two knots 3. The displacement angle α which exceeds 90° enables a reliable renewed insertion of the tying agent strands 4.1, 4.2 in the twine holding disk 7 for producing the second knot 3.

The twine holding disk 7 that is employed here comprises in addition a second pair 16.2 of recesses 15.1, 15.2 which are provided for producing a following knot pair 3. For this purpose, the two pairs 16.1, 16.2 of recesses 15.1, 15.2 are arranged rotated by 180° relative to each other at the twine holding disk 7.

The twine holding disk 7 comprises here two disks 7.1, 7.2 that are parallel to each other (see FIG. 3a) of the same size which are spaced apart from each other and between which a stop (not illustrated) extends concentrically about the twine holding disk axis 42. Both disks 7.1, 7.2 of the twine holding disk 7 comprise therefore both pairs 16.1, 16.2 recesses 15.1, 15.2. In addition, the recesses 15.1, 15.2 are arranged at the same rotational angle (see FIG. 3b).

The holding arrangement comprises moreover a twine clamping lever 14 (see FIG. 3a, 2f) wherein the twine clamping lever 14 interacts with the twine holding disk 7 in order to secure the tying agent strands 4.1, 4.2 in one of the recesses 15.1, 15.2. The twine clamping lever 14 comprises for this purpose at least one clamping stay 14.1 arranged between the disks 7.1, 7.2 of the twine clamping disk 7. In the present embodiment, it comprises in addition a further clamping stay 14.2 which is arranged substantially parallel to the at least one clamping stay 14.1. The second clamping stay 14.2 improves holding of the tying agent strands 4.1, 4.2 in comparison to only one clamping stay 14.1.

The at least one clamping stay 14.1 is arranged between the two disks 7.1, 7.2 of the twine clamping disk 7. It is contacting the stop of the twine holding disk 7 when no tying agent strand 4.1, 4.2 is inserted in the twine holding disk 7.

The twine clamping lever 14 is forced by the force of a spring (not illustrated) about a clamping axis 51 in a clamping direction 52 against the stop. Upon rotation of the twine holding disk 7, the tying agent strands 4.1, 4.2 inserted in the recesses 15.1, 15.2 are clamped between the twine holding disk 7 and the twine clamping lever 14. Since the twine clamping lever 14 is forced only by the force of the spring against the stop, it can yield, in particular for thicker tying agents, at least minimally opposite to the clamping direction 52. The force of the spring is however provided sufficiently great in order to ensure a safe holding of the tying agent strands 14.1, 14.2 during production of the knot 3.

Furthermore, the twine knotter 1 comprises the rotatingly driven knotter disk 8. The knotter disk 8 extends concentrically about a knotter disk axis 40 which extends in the direction of the knotter shaft 37. At the knotter disk 8, for each one of the two knots 3, respective first drive means 9.1, 9.2 for driving the knotter hook 5 is arranged. For driving the knotter hook 5, the drive wheel 54 is fixedly fastened at the shaft 24 (see FIG. 3c) of the knotter hook 5. The first drive means 9.1, 9.2 are designed as tooth segments which upon rotation of the knotter disk 8 engage teeth (not identified) of the drive wheel 54 so that the drive wheel 54 is driven upon rotation of the knotter disk 8 in a rotational direction 30. In this way, the knotter hook 5 is rotated about the knotter hook axis 44 in the knotter hook rotational direction 43.

In addition, at least one second drive means 10.1 for driving the twine holding disk 7 is arranged at the knotter disk 8. The second drive means 10.1 is also embodied as a tooth segment. For driving the twine holding disk 7, a drive element 55 is fastened to the knotter frame 6 (see FIG. 4a in this context) whose teeth (not identified) upon rotation of the knotter disk 8 come into engagement with the second drive means 10.1.

In this way, the drive element 55 is driven. The drive element 55 is arranged at an end of a driver shaft (not illustrated) that at its oppositely positioned end (not identified) is provided with a worm gear 56. The worm gear 56 meshes with a disk wheel 57 so that the latter, when the worm gear 56 is driven, rotates about the twine holding disk axis 42 in the twine holding disk rotational direction 41. The disk wheel 57 is also arranged at the end of a disk shaft (not illustrated) having at its oppositely positioned end (not identified) the twine holding disk 7 fixedly connected thereto. Upon driving of the disk wheel 57, the twine holding disk 7 rotates therefore together with it.

The second drive means 10.1 embodied as a tooth segment, the drive element 55, the worm gear 56 as well as the disk wheel 57 are matched to each other such that a reducing transmission ratio of 1:4 is realized. Depending on a diameter (not identified) of the knotter disk 8, a diameter (not identified) of the twine holding disk 7, and the number of teeth (not identified) at these components, a different step-down transmission ratio can be provided however also.

The twine knotter 1 comprises moreover a stripper lever 11 for stripping the knots 3 from the knotter hook 5. The stripper lever 11 is pivotable in and opposite to a pivot direction 49 about a pivot bearing 64 through which extends a pivot axis 48.

The stripper lever 11 is approximately L-shaped. It comprises an arm 76 (see FIG. 2a) that extends away from the pivot bearing 64 toward a transverse plate 65 that extends approximately transversely thereto.

At the knotter disk 8, a stripper guide 45 is arranged at which a roller 60 (see FIG. 4a) arranged at the stripper lever 11 can run. The stripper lever 11 is pivoted, depending on the course of the stripper guide 45, about the pivot axis 48 in the pivot direction 49 and back. At the stripper lever 11, pin-shaped strippers 53 are provided which are spaced apart from each other. A distance (not identified) of the strippers 53 from each other is slightly larger than a width B (see FIG. 3d) of the knotter hook 5. The strippers 53 are provided for stripping off a knot 3 from the knotter hook 5. For this purpose, the stripper lever 11 is pivoted in the pivot direction 49. After stripping, the stripper lever 11 is pivoted back.

Moreover, the stripper lever 11 comprises a puller 13. The puller 13 extends approximately parallel to the arm 76 and is spaced therefrom. It is fastened to the transverse plate 65. With the puller 13, the ends 4.3 of the tying agent strands 4.1, 4.2 can be pulled out from the holding arrangement for finishing the second knot 3.

For cutting through the tying agent strands 4.1, 4.2, a knife blade 12 is moreover held in the twine knotter 1. The knife blade 12 is positioned such that the twine holding disk 7 upon rotation into the twine holding rotational direction 41 is guided along the knife blade 12. In this way, the tying agent strands 4.1, 4.2 inserted in the holding arrangement are cut through upon passing the knife blade 12. The knife blade 12 can be fastened for this purpose substantially stationarily in the twine knotter 1, in particular at the knotter frame. In the embodiment illustrated here, it is fastened at the twine clamping lever 14. In this embodiment, when the twine clamping lever 14 as a function of the thickness of the employed tying agent yields, it can yield slightly together therewith. Therefore, the knife blade 12 in this embodiment is not stationarily fastened in the twine knotter 1 but moves upon yielding of the twine clamping lever 14 together therewith. The phrase "substantially" accounts for this fact in the context of this invention.

In order to produce the two sequential knots 3 without generating in this context a tying agent rest for each tying agent strand 4.1, 4.2, the present invention provides that the tying agent strands 4.1, 4.2 are cut through only once between the first and the second knot 3. Moreover, the present invention provides that the twine holding disk 7 upon completion of the second knot 3 is stopped before the tying agent strands 4.1, 4.2 pass the knife blade 12. Since the twine holding disk 7 is stopped already prior to passing again the knife blade 12, the tying agent strands 4.1, 4.2 upon producing the second knot 3 are not at all cut through. In this way, when producing this knot 3, there is also no tying agent rest generated for each tying agent strand 4.1, 4.2.

Producing the two knots 3 with the twine knotter 1 will be explained in a stepwise manner in the following with the aid of FIGS. 2a-2k.

FIG. 2a shows the twine knotter 1 in the zero position. In the zero position, a knot 3 can be released from the knotter hook 5 when a pulling force 73 is acting on it which is caused in particular by the crop bale 2 and which has an extension component opposite to a second spatial direction 21 in which a shaft 24 (see FIGS. 3c-3e) of the knotter hook 5 is extending. In the zero position, neither the drive wheel 54 for driving the knotter hook 5 nor the drive element 55 for driving the twine holding disk 7 are in engagement with one of their drive means 9.1, 9.2, 10.1 on the knotter disk 8. The knotter hook 5 and the twine holding disk 7 are therefore not driven in the zero position. In the zero position, the stripper lever 11 is located in a still slightly pivoted position about the pivot axis 48 in pivot direction 49. The upper thread 4.1 is passed through the top twine needle 47. Accordingly, a cutout (not identified), provided in the stripper lever 11 and in particular being approximately U-shaped, is arranged below the knotter hook 5.

FIG. 2b shows the twine knotter 1 in a position rotated by a rotational angle of 150°. Even in this position, neither the knotter hook 5 nor the twine holding disk 7 have rotated. The stripper lever 11 has been pivoted back opposite to the pivot direction 49. In addition, the bottom twine needle 36 has been pivoted in a feed direction 50 into the twine knotter 1. The bottom twine needle 36 is therefore in an upward stroke. It entrains the lower thread 4.2. Also, upon pivoting into the twine knotter 1, it entrains the upper thread 4.1. Upon pivoting of the bottom twine needle 36, upper thread 4.1 and lower thread 4.2 are placed into the first recess 15.1 of the two recesses 15.1, 15.2 of the first pair 16.1 of the twine holding disk 7. FIG. 2b shows the tying agent strands 4.1, 4.2 inserted in the first recess 15.1. The insertion is realized therefore by the upward stroke of the bottom needle 36.

FIG. 2c shows the twine knotter 1 in a position rotated by a rotational angle of 185°. In this position, the twine holding disk 7 has been rotated so far that the tying agent strands 4.1, 4.2 are clamped in the holding arrangement between the twine holding disk 7 and the twine clamping lever 14. The twine clamping lever 14 clamps the tying agent strands 4.1, 4.2 with the force of the spring.

In addition, in this position the drive wheel 54 is in engagement with the first one of the two first drive means 9.1, 9.2 on the knotter disk 8 so that the knotter hook 5 is driven by the knotter disk 8 and rotates about the knotter hook axis 44 in the knotter hook rotational direction 43. Visible here is the control roller 46 arranged at the backside of the knotter hook 5 and provided for driving the pivotable clamping wing 19.

Upon rotation, the tying agent strands 4.1, 4.2 are wound about the knotter hook 5. This causes a loop (not identified) to be formed about the knotter hook 5.

FIG. 2d shows the twine knotter 1 in a position rotated by a rotational angle of 205°. In this position, the knotter hook 5 has completely rotated about its knotter hook axis 44. In this context, the control roller 46 of the knotter hook 5 has been guided completely along the control guide 63 for opening and closing of the pivotable clamping wing 19. In this context, the tying agent strands 4.1, 4.2 have been inserted between the stationary clamping wings 18 and the pivotable clamping wing 19 and are positioned upstream of the projection 20 of the pivotable clamping wing 19.

The twine holding disk 7 has in addition rotated so far that the tying agent strands 4.1, 4.2 clamped in the holding arrangement are now arranged in front of a cutting edge of the knife blade 12.

Moreover, the bottom twine needle 36 has already pivoted back slightly opposite to the feed direction 50. It is therefore in a downward stroke.

FIG. 2e shows the twine knotter 1 in a position rotated by a rotational angle of 220°. In this position, the twine holding disk 7 has rotated so far that the tying agent strands 4.1, 4.2 have passed the knife blade 12 and have been cut through by it. The tying agent strands 4.1, 4.2 are therefore now divided into first tying agent strands 4.1, 4.2 at the crop bale side and second tying agent strands 4.1, 4.2 at the bottom needle side.

Upon further rotation of the twine holding disk 7, the tying agent strands 4.1, 4.2 at the bottom needle side have been inserted moreover into the second recess 15.2 of the first pair 16.1 of recesses 15.1, 15.2. When producing the second knot 3, the tying agent strands 4.1, 4.2 are therefore inserted into the twine holding disk 7 by the downward stroke of the bottom needle 36.

FIG. 2f shows an enlarged detail of FIG. 2e. Visible are the tying agent strands 4.1, 4.2 at the crop bale side wound about the knotter hook 5 immediately prior to pulling the first knot 3 from the knotter hook 5. When pulling the tying agent strands 4.1, 4.2 from the knotter hook 5, the tying agent strands 4.1, 4.2 which are inserted between the stationary clamping wings 18 and the pivotable clamping wing 19 by means of the projection 20 at the pivotable clamping wing 19 are pulled through the loop of the tying agent strands 4.1, 4.2 wound about the knotter hook 5. In this way, the first knot 3 is formed.

The tying agent strands 4.1, 4.2 are pushed or the first knot 3 is pushed by means of the stripper lever 11 from the knotter hook 5. For this purpose, the roller 60 of the stripper lever 11 is guided along the stripper guide 45. The stripper guide 45 comprises two cams (not identified) so that the stripper lever 11 upon rotation of the knotter disk 8 is pivoted twice forwardly in order to push thereby a knot 3 off the knotter hook 5, respectively. For pushing the knot 3 from the knotter hook 5, the pin-shaped strippers 53 of the stripper lever 11 that are spaced apart from each other are utilized.

So that the knot 3 can fall toward the crop bale, the gap 17 is provided in the knotter hook. The finished knot 3 falls through the gap 17 to the crop bale.

FIG. 2g shows the twine knotter 1 in a position rotated by a rotational angle of 240°. In this position, the stripper lever 11 is pivoted in pivot direction 49 and has pushed the knot 3 off the knotter hook 5. The bottom needle 36 has been pivoted back farther opposite to the feed direction 50.

FIG. 2h shows the twine knotter 1 in a position rotated by a rotational angle of 280°. In this position, the twine holding disk 7 is in an end position. It is no longer driven in the context of the actual rotation of the knotter disk 8. The tying agent strands 4.1, 4.2 clamped in the holding arrangement are arranged immediately in front of the knife blade 12.

The stripper lever 11 is pivoted back in FIG. 2h opposite to the pivot direction 48. In addition, the bottom twine needle 36 has been pivoted back at this rotational angle opposite to the feed direction 50.

The second one of the first drive means 9.2 at the knotter disk 8 has reached the drive wheel 54 of the knotter hook 5. In this way, the drive wheel 54 engages this first drive means 9.2. The twine knotter 1 is thus immediately before forming the second knot 3.

FIG. 2i shows the twine knotter 1 in a position rotated by a rotational angle of 330°. The knotter hook 5 has completed the second complete rotation about the knotter hook axis 44. Therefore, a loop about the knotter hook 5 has been formed and the tying agent strands 4.1, 4.2 have been inserted in addition below the pivotable clamping wing 19.

The illustration shows therefore the second knot 3 immediately prior to being pushed off by the stripper lever 11.

FIG. 2j shows this in an enlarged detail. It can be seen that the stripper lever 11 is undergoing a pivot movement in pivot direction 49. Since the tying agent strands 4.1, 4.2 are still clamped in the holding arrangement, the puller 13 fastened at the stripper lever 11 contacts the tying agent strands 4.1, 4.2 and pulls the ends 4.3 of the tying agent strands 4.1, 4.2 during the pivot movement of the stripper lever 11 out of the holding arrangement. In addition, in analogy to the first knot 3, the second knot 3 is pushed in this context by means of the pin-shaped strippers 53 off the knotter hook 5.

Figure 2K:
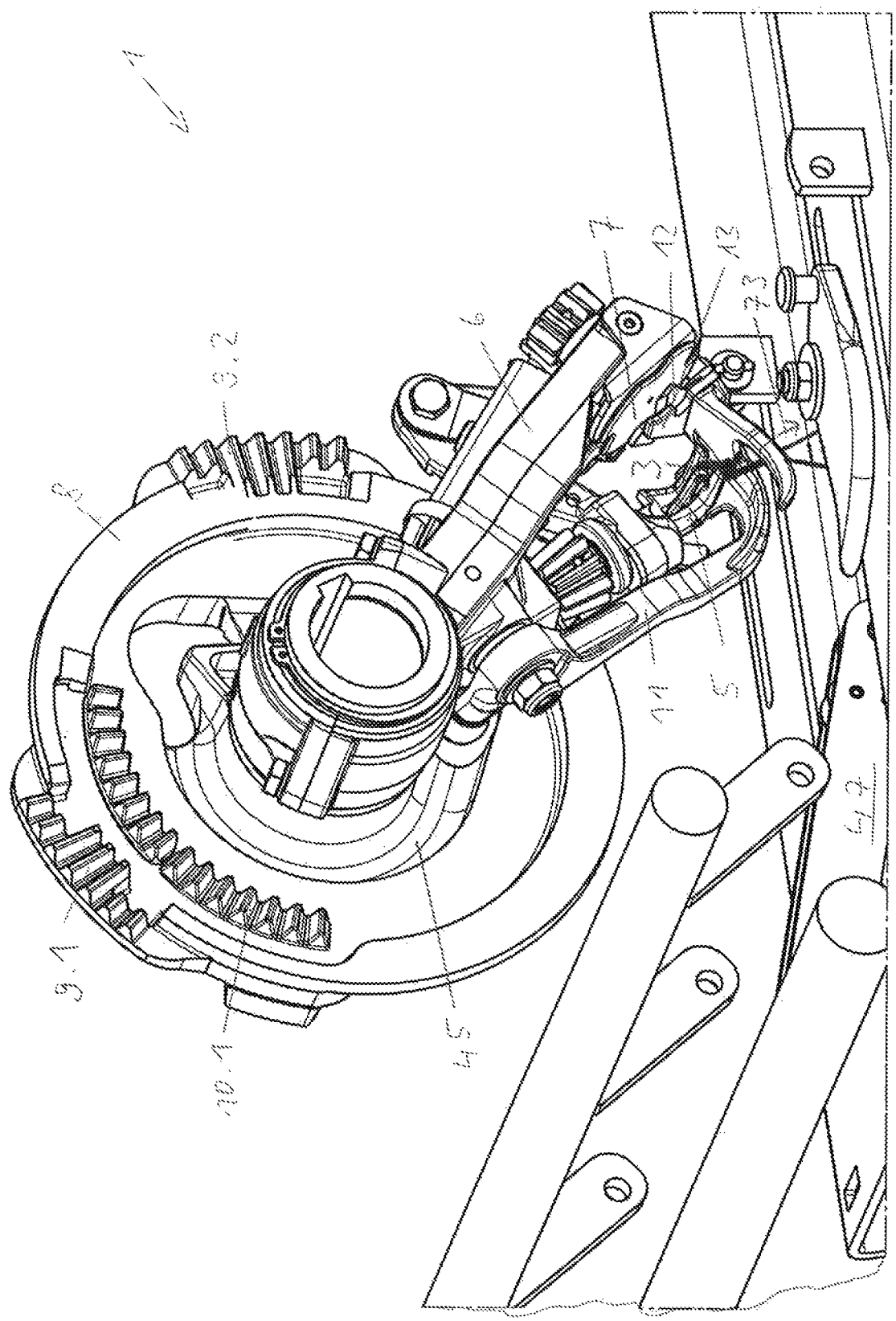

FIG. 2k shows the twine knotter 1 in a position rotated by a rotational angle of 360°. It is in the zero position (see FIG. 2a). The puller 13 has pulled the ends 4.3 of the tying agent strands 4.1, 4.2 and the strippers 53 have pushed the second knot 3 off the knotter hook 5. The second knot 3 also falls opposite to the second direction 21 through the gap 17 in the knotter hook 5 to the crop bale. The stripper lever 11 is carrying out a pivot movement opposite to the pivot direction 49.

In FIG. 2k, the pulling force 73, directed toward the crop bale and by means of which the knot 3 is pulled off the knotter hook so that it falls down from the latter, is schematically illustrated.

Figure 3E:
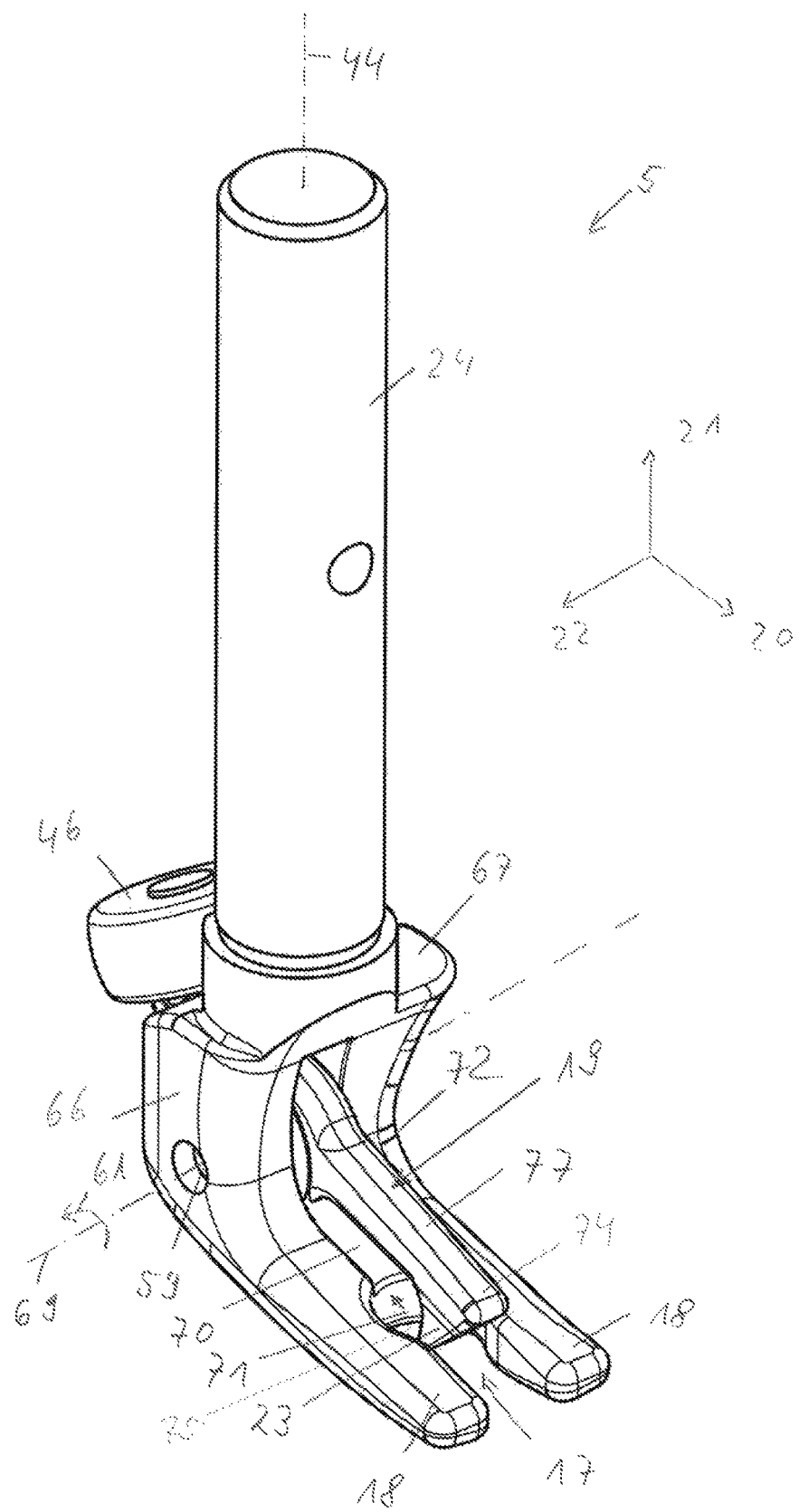
FIG. 3e shows a perspective view of the knotter hook of FIG. 3c.

FIG. 3a shows an enlarged partial view of the twine knotter 1 of FIG. 2b, in FIG. 3b a twine holding disk 7 for the twine knotter 1 of FIG. 3a, in FIG. 3c a knotter hook 5 for the twine knotter 1 of FIG. 3a in a side view, in FIG. 3d a plan view of the knotter hook 5 of FIG. 3c, and in FIG. 3e a perspective view of the knotter hook of FIG. 3c.

FIG. 3b shows one of many possible embodiments of the twine holding disk 7 in a side view. The twine holding disk 7 illustrated here is embodied for producing two knot pairs 3. Visible is one of the disks 7.1 the twine holding disk 7 with the two pairs 16.1, 16.2 of recesses 15.1, 15.2. The twine holding disk 7 can however be configured also for only one pair of knots 3 or for three or more knot pairs 3. In principle, it is however also possible to configure the twine holding disk 7 for an uneven number of knots 3 so that a recess 15.1, 15.2 of the twine holding disk 7 is used alternately for producing the first of the two knots 3 and then for producing the second of the two knots 3.

In the illustrated twine holding disk 7, between the recesses of a knot pair 3 a displacement angle $\alpha$ of 100° is provided. For the selected step-down transmission ratio between the knotter disk 8 and the twine holding disk 7, a displacement angle $\alpha$ of greater than 90° is required in order to be able to insert into the second one of the two recesses 15.2 the tying strands 4.1, 4.2. The displacement angle $\alpha$ can however be also significantly greater than 90°, and in particular can amount to up to approximately 150°.

Between the two pairs 16.1, 16.2 of recesses 15.1, 15.2, a complementary angle $\beta$ of 80° is provided. In this way, an arrangement with rotational symmetry of the pairs 16.1, 16.2 of recesses 15.1, 15.2 is realized.

FIG. 3c shows the knotter hook 5 for the twine knotter 1 in a side view, FIG. 3d in a plan view from above, and FIG. 3e in a perspective view. The knotter hook comprises here two stationary clamping wings 18. In addition, it comprises a pivotable clamping wing 19. The clamping wings 18, 19 comprise a length extension component in the same first spatial direction 20. Also, an embodiment of a knotter hook 5 is usable that comprises only one stationary clamping wing 18 and the pivotable clamping wing 19.

The stationary clamping wing 18 extends from a base 66 of the knotter hook 5 toward a free end (not identified). The pivotable clamping wing 19, on the other hand, is supported pivotably in and opposite to the wing pivot direction 61 about a wing pivot axis 69 in a pivot wing bearing 59 that is provided in the base 66 of the knotter hook 5. The pivotable clamping wing 19 also comprises a free end 74.

The pivotable clamping wing 19 comprises a projection 23 which is projecting in the direction toward the stationary clamping wing 18. The projection extends therefore opposite to the second spatial direction 21. It is here arranged at the free end 74 of the pivotable clamping wing 19. In principle, the pivotable clamping wing 19 can also extend past the projection 23 to its free end 74. The projection 19 extends for this purpose additionally at a substantially right angle $\delta$ to a pivot wing 77 of the pivotable wing 19 at which it is arranged. It is configured hook-shaped, here of a triangular shape.

The pivotable clamping wing 19 is arranged here laterally displaced relative to both stationary clamping wings 18 at least toward the free end of the clamping wings 18, 19, respectively, in a third spatial direction 22 that extends transversely to the first spatial direction 20 and transversely to the second spatial direction 21. In this context, the stationary clamping wings 18 are arranged mirror-symmetrical to a fictitious line (not illustrated) that is extending centrally through the pivotable clamping wing 19. The stationary clamping wings 18 comprise in this context the same length LF. In addition, the pivotable clamping wing 19 is provided shorter than the stationary clamping wings 19.

Moreover, the two stationary clamping wings 18 are spaced apart from each other here at least at the ends so that between them a gap 17 is formed. In addition, the pivotable clamping wing 19 in a plan view is arranged between the two stationary clamping wings 18 at least at the end. In this way, the projection 23 is positioned laterally relative to the two stationary clamping wings 18 between them. The gap 17 extends between the stationary clamping wings 18 and below the pivotable clamping wing 19 opposite to the first spatial direction 20 past the projection 23. In this way, not only below but also behind the projection 23 viewed opposite to the first spatial direction 21, a free space is provided through which a knot 3 that has been completed by the knotter hook 5 can fall down in this direction 21, in particular when a pulling force 73 opposite to the second spatial direction 21 is acting thereon.

The pivotable clamping wing 19 is therefore only partially height-displaced in relation to the stationary clamping wings 18 in a second spatial direction 21 which is extending transversely to the first spatial direction 20. In this way, the projection 23 engages the gap 17 between the stationary clamping wings 18 only minimally.

In principle, the gap 17 can be designed in a U-shape or V-shape. However, it has been found that an approximately key-hole shaped expansion 75 of the gap 17 is advantageous wherein in this way the gap 17 is widened at an end which is facing the pivot wing bearing 59. In this way, more space is available for the tying agent strands 4.1, 4.2 and the knot 3 can more easily and faster detach from the knotter hook 5.

The pivotable clamping wing 19 can be pivoted by pivoting in the wing pivot direction 61 from a closed state into an open state. In the open state, the free end 74 of the pivotable clamping wing 19 is spaced apart farther from the stationary clamping wings 18 than in the closed state. In the open state, the tying agent strands 4.1, 4.2 can be inserted between the stationary and the pivotable clamping wings 18, 19. The projection 23 is provided for pulling the tying agent strands 4.1, 4.2 that have been inserted between the stationary and the pivotable clamping wings 18, 19 through a tying agent loop formed of the tying agent strands 4.1, 4.2 and looped around the base 66 of the knotter hook 5. For this purpose, the pivotable clamping wing 19 is closed and the tying agent strands 4.1, 4.2 are clamped between the stationary and the pivotable clamping wings 18, 19.

In order to effect pivoting of the pivotable clamping wing 19, a control roller 46 is provided at an end oppositely positioned to the free end 74 of the pivotable clamping wing 19. The control roller 46 is arranged at a side (not identified) of the pivot wing bearing 59 that is facing away from the free end. Therefore, the pivotable clamping wing 19 is pivoted from the closed state into the open state or vice versa upon adjustment of the control roller 46.

In the twine knotter 1, the control roller 46 is guided along a control guide 63 (see FIG. 3a) that is arranged stationarily at the knotter frame 6. The control guide 46 enables for each one of the knots 3 a single opening from the closed state into the open state and closing from the open state into the closed state of the pivotable clamping wing 19, respectively.

The stability of the knotter hook 5 is increased in that the base 66 extends below the pivotable clamping wing 19. A length LS of the gap 17 or a length LK of the stationary clamping wing 18 relates to a length LR of the base 66 in a holding region 68 of the knotter hook 5, which is provided for clamping tying agent strands 4.1, 4.2 between the stationary clamping wings 18 and the pivotable clamping wing 19, preferably at least in a ratio of 1:1 or larger, preferably 2:1 or 3:1 or even larger. The base 66 extending below the pivotable clamping wing 19 is therefore embodied only very short in comparison to the gap 17 or to the clamping wings 18, 19. Preferably, the base 66 serves only for stabilization of the knotter hook 5. The shorter the base 66 is extending below the pivotable clamping wing 19, the larger is the gap 17 and all the more easily the knots 3, in particular when made of a relatively thick tying material, can be pulled at the end of the knotting process from the knotting hook 5.

The base 66 which is extending in the holding region 68 below the pivotable clamping wing 19 comprises in addition a recess 70 providing space for the tying agent strands 4.1, 4.2 clamped between the pivotable clamping wing 19 and the stationary clamping wings 18. In order not to chafe the tying agent strands 4.1, 4.2, the recess 70 can be rounded.

In order to facilitate pulling off the knot 3 from the knotter hook 5 even more, it is furthermore preferred that an end face 71 of the gap 17 substantially extends in the second spatial direction 21 so that a finished knot 3 cannot get caught at the end face 71 or an edge (not illustrated) of the end face 71, or get chafed.

The pivotable clamping wing 19 is embodied as a whole more narrow than the gap 17. This embodiment is advantageous when pulling the tying agent strands 4.1, 4.2 through the tying agent loop as well as when stripping off the knot 3 from the knotter hook 5.

In order to attach the knotter hook 5 rotatably in the twine knotter 1, it comprises a shaft 24 for support in the twine knotter 1. The shaft 24 is arranged in relation to the stationary clamping wings 18 at an angle γ. Since the tying agent loop for the knot 3 requires a complete rotation of the knotter hook 5 about the knotter hook axis 44, in the twine knotter 1 a free space (not identified) is required for the knotter hook 5 that corresponds to a length (not identified) of the stationary clamping wing 18. The angled arrangement of the clamping wing 18 to the shaft 24 is therefore space-saving.

The required bend 72 in the base 66 is embodied rounded so that the base 66 has no edges in the bend 72 and the tying agent strands 4.1, 4.2 cannot get chafed at the bend 72.

Formation of the tying agent loop about the base 66 of the knotter hook 5 is facilitated by a ramp-shaped expansion 67 of the base 66 below the shaft 24 by means of which the tying agent loop, upon rotation of the knotter hook 5, winds about the base 66 below the control roller 46.

Figure 4A:
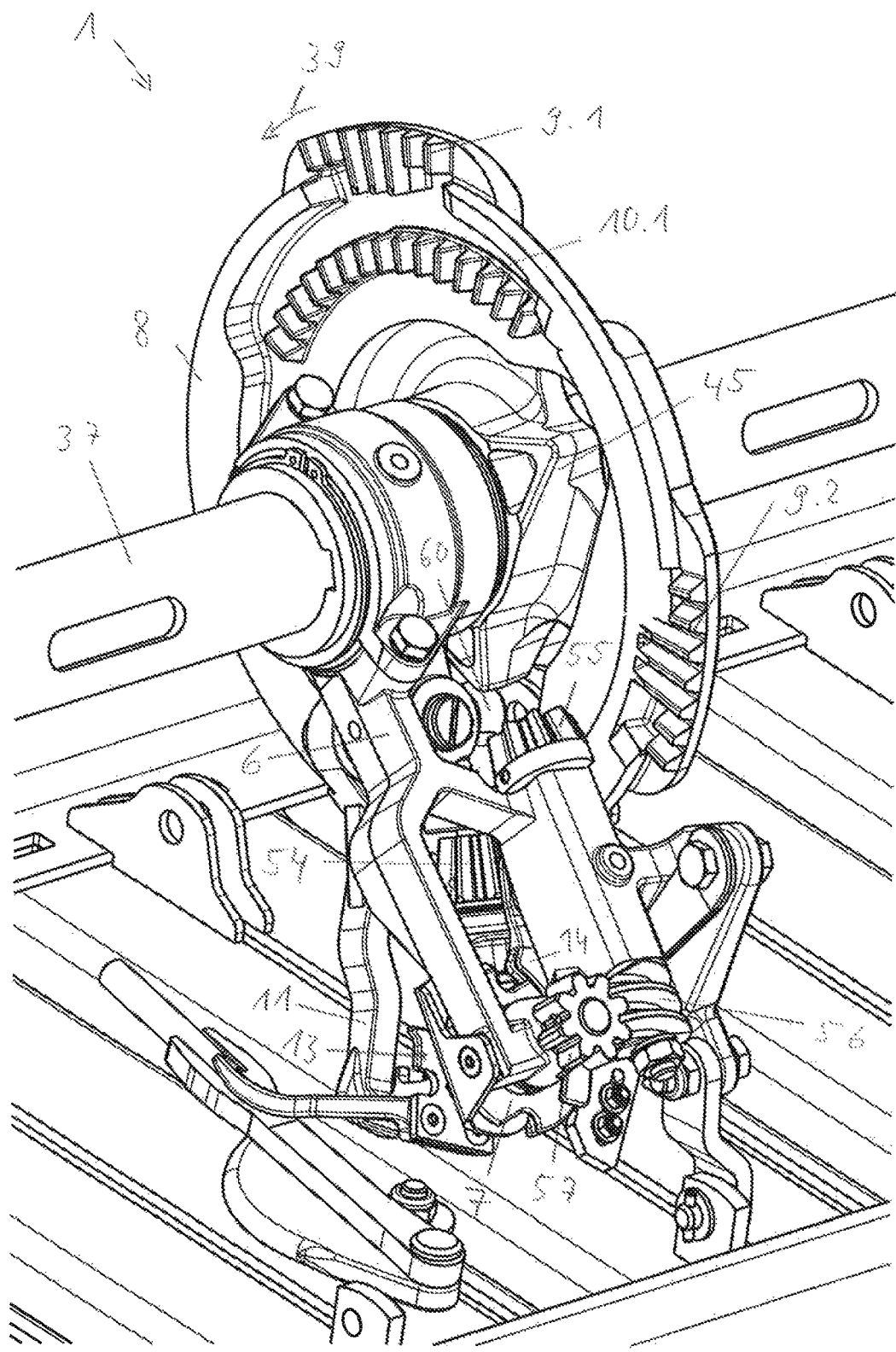
FIG. 4a shows a further perspective view of the twine knotter of FIGS. 2a to 2k.

FIG. 4a shows a further perspective view of the twine knotter 1 of FIGS. 2a-2k, and FIG. 4b shows a perspective view of a further embodiment of a twine knotter 1' for the knotter arrangement 34 of FIG. 1b.

The tying process of the twine knotter 1 of FIG. 4a for producing the two knots 3 comprises the following steps:

a. Inserting the tying agent strands 4.1, 4.2 into the first recess 15.1 of the first pair 16.1 of recesses 15.1, 15.2 at the twine holding disk 7 in the upward stroke of the bottom needle 36;

b. Rotating the twine holding disk 7 and thereby clamping the tying agent strands 4.1, 4.2;

c. During rotation of the twine holding disk 7, rotating the knotter hook 5, wherein the pivotable clamping wing 19 is pivoted once from the closed state into the open state and back in order to place the tying agent strands 4.1, 4.2 between the stationary and the pivotable clamping wings 18, 19;
d. During rotation of the twine holding disk 7, inserting the tying agent strands 4.1, 4.2 into the second recess 15.2 of the two recesses 15.1, 15.2 of the pair 16.1 during the downward stroke of the bottom needle 36;
e. Upon further rotation of the twine holding disk 7, passing the knife blade 12 whereby the tying agent strands 4.1, 4.2 are cut through by the knife blade 12;
f. Pivoting the stripper lever 11 for stripping off the first knot 3 from the knotter hook 5;
g. Stopping the twine holding disk 7 when the tying agent strands 4.1, 4.2 have arrived in front of the cutting edge of the knife blade 12;
h. Rotating the knotter hook 5 in analogy to (c);
i. Pivoting the stripper lever 11 for pulling out the ends 4.3 of the tying agent strands 4.1, 4.2 with the puller 13 of the stripper lever 11 from the holding arrangement and for stripping off the second knot 3 from the knotter hook 5;
j. Pulling out the knot 3 from the twine knotter 1 by a pulling force on the knot 3 opposite to the second direction 21, in particular caused by advancing the crop bale 2.

The method for forming the two sequential knots 3 comprises therefore the essential features that between the first and the second knot 3 the tying agent strands 4.1, 4.2 are cut through and that the twine holding disk 7 is stopped before the tying agent strands 4.1, 4.2 have passed the knife blade 12 in the production of the second knot 3.

Figure 4B:
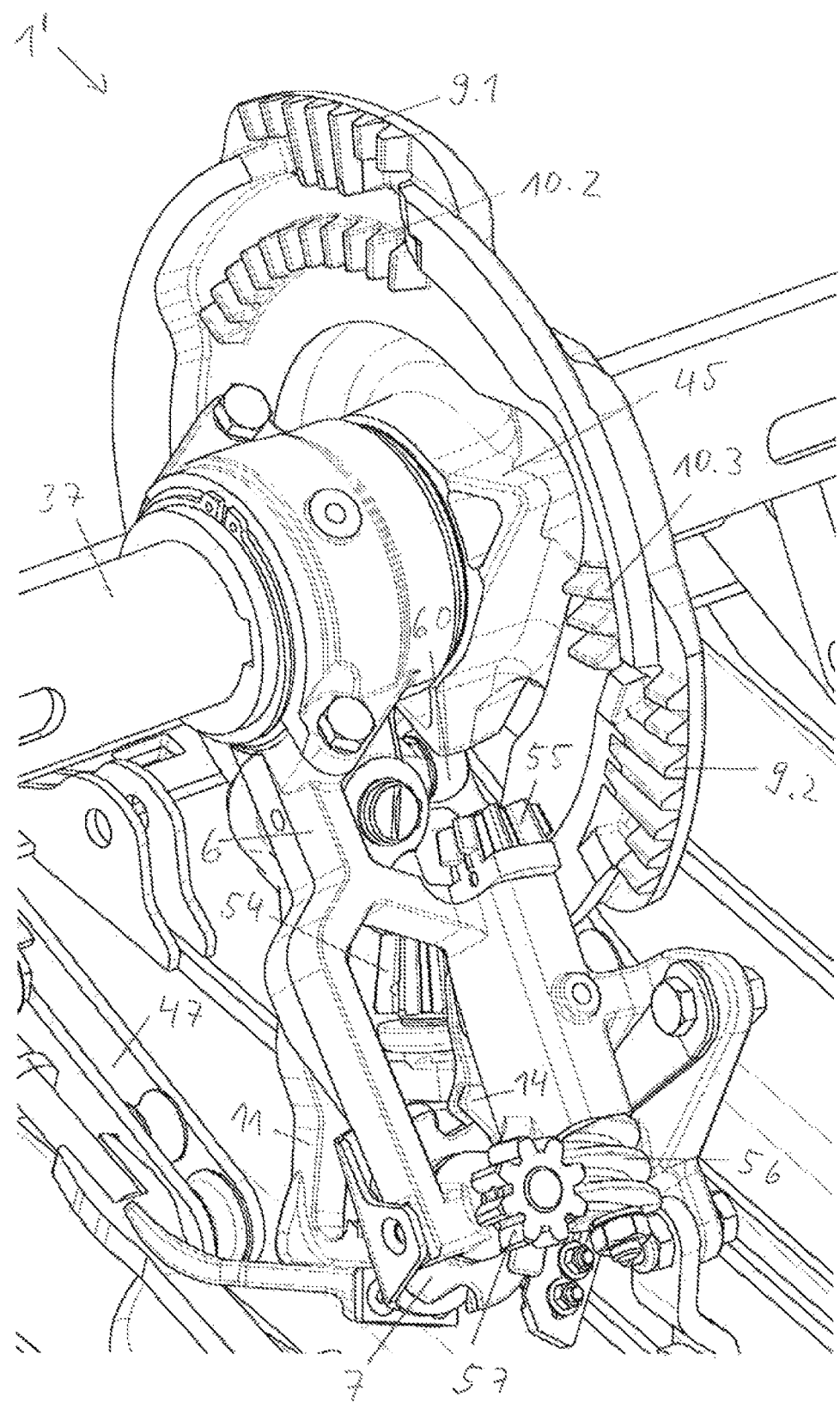
FIG. 4*b* shows a perspective view of a further embodiment of a twine knotter for the knotter arrangement of FIG. 1*b*.

The embodiment of the twine knotter 1' of FIG. 4b not only comprises a single second drive means 10.1 for driving the twine holding disk 7 but two second drive means 10.1, 10.2. The second one of the two second drive means 10.1, 10.2 is embodied also as a tooth segment.

In the here provided twine holding disk 7, the twine knotter 1' in analogy to the embodiment of FIG. 4a rotates by 180° per knot pair 3. In this embodiment of the twine knotter 1', a rotational angle of the twine holding disk 7 of 135° is however carried out during the formation of the first knot 3 due to the first one of the two second drive means 10.1. In this context, the twine holding disk 7 guides the tying agent strands 4.1, 4.2 along the knife blade 12 so that they are cut through. During the production of the second knot 3, the twine holding disk 7 rotates about the still missing rotational angle of 45°. For this purpose, the second one of the two second drive means 10.1 is provided. The tying agent strands 4.1, 4.2 are subsequently held in the holding arrangement above a cutting edge of the knife blade 12 and are not cut through.

Therefore, the method for forming the two sequentially produced knots 3 in this embodiment of the twine knotter 1' also comprises the important features that between the first and the second knots 3 the tying agent strands 4.1, 4.2 are cut through and that the twine holding disk 7 is stopped before the tying agent strands 4.1, 4.2 in the production of the second knot 3 pass the knife blade 12.

In the embodiment of FIG. 4b, the length of the tying agent strands 4.1, 4.2, held by the holding arrangement at the backside of the twine holding disk 7 between the production of the first knot 3 and the production of the second knot 3, corresponds to the rotational angle that the twine holding disk 7 upon being driven by the first one of the two second drive means 10.1 covers before the tying agent strands 4.1, 4.2 are cut. This rotational angle amounts here to 135°. In contrast to this, the twine holding disk 7 in the embodiment of the twine knotter 1 of FIG. 4a only covers a rotational angle of 100° before the tying agent strands 4.1, 4.2 are cut. The ends 4.3 of the tying agent strands 4.1, 4.2 that are held in the holding arrangement for forming the second knot 3 are therefore longer in the embodiment of the twine knotter 1' of FIG. 4b than in the embodiment of the twine knotter 1 of FIG. 4a. In order to save tying material, the embodiment of FIG. 4a has therefore proven to be advantageous in comparison to that of FIG. 4b.

In comparison to the afore described tying process of the twine knotter 1 of FIG. 4a, producing the two knots 3 in the twine knotter 1' of FIG. 4b therefore comprises the steps:
a. Inserting the tying agent strands 4.1, 4.2 into the first recess 15.1 of the first pair 16.1 of recesses 15.1, 15.2 at the twine holding disk 7 in the upward stroke of the bottom needle 36;
b. Rotating the twine holding disk 7 and clamping the tying agent strands 4.1, 4.2;
c. During the rotation of the twine holding disk 7, rotating the knotter hook 5, wherein the pivotable clamping wing 19 is pivoted once from the closed into the open state and back in order to place the tying agent strands 4.1, 4.2 between the stationary and the pivotable clamping wings 18, 19;
d. Rotating the twine holding disk 7 farther, wherein the tying agent strands 4.1, 4.2 pass the knife blade 12 and thereby are cut through;
e. Pivoting the stripper lever 11 for stripping off the first knot 3 from the knotter hook 5;
f. Stopping the twine holding disk 7;
g. Inserting the tying agent strands 4.1, 4.2 into the second recess 15.2 of the two recesses 15.1, 15.2 of the pair 16.1 upon downward stroke of the bottom needle 36;
h. Rotating the twine holding disk 7 farther;
i. Rotating the knotter hook 5 in analogy to (c);
j. Pulling out the ends of the tying agent strand 4.3 with the puller 13 of the stripper lever 11 from the holding arrangement and stripping off the second knot 3 from the knotter hook 5;
k. Pulling out the knot 3 from the twine knotter 1 by a pulling force on the knot 3 opposite to the second direction 21, in particular caused by advancing the crop bale 2.

What is claimed is:
1. A twine knotter for a bale press for forming two sequential knots for holding together a tying agent surrounding a crop bale, the twine knotter comprising:
a knotter frame;
a knotter hook supported rotatably in the knotter frame and configured to knot ends of the tying agent;
a holding arrangement comprising a twine holding disk, wherein the twine holding disk is rotatably supported at the knotter frame and is configured to convey temporarily two tying agent strands of the tying agent;
a knotter disk configured to be rotatingly driven, wherein the knotter disk comprises a first drive means configured to drive the knotter hook and further comprises a second drive means configured to drive the twine holding disk;
a stripper lever configured to strip off the knots from the knotter hook;
a knife blade configured to cut through the tying agent strands;
wherein the twine holding disk upon rotation is guided along the knife blade so that the tying agent strands are cut through upon passing the knife blade;

wherein the twine holding disk is configured to stop prior to completion of a second one of the two sequential knots before the tying agent strands held in the holding arrangement pass the knife blade.

2. The twine knotter according to claim 1, wherein the stripper lever comprises a puller configured to pull out the tying agent strands from the holding arrangement.

3. The twine knotter according to claim 1, wherein the knife blade is arranged substantially stationarily in the twine knotter.

4. The twine knotter according to claim 1, wherein the holding arrangement further comprises a twine clamping lever, wherein the twine holding disk comprises a recess, and wherein the twine clamping lever interacts with the twine holding disk to secure the tying agent strands in the recess of the twine holding disk.

5. The twine knotter according to claim 4, wherein the knife blade is fastened at the twine clamping lever.

6. The twine knotter according to claim 1, wherein the knife blade is fastened at the knotter frame.

7. The twine knotter according to claim 1, wherein the twine holding disk comprises a first pair of at least two first recesses arranged at an outer contour of the twine holding disk, wherein the at least two first recesses are arranged displaced relative to each other by a displacement angle greater than 90° opposite to a clockwise direction in relation to a rotational movement of the twine holding disk in a rotational direction about a twine holding disk axis.

8. The twine knotter according to claim 7, wherein the twine holding disk further comprises a second pair of at least two second recesses arranged at the outer contour of the twine holding disk, wherein the at least two second recesses are arranged displaced relative to each other by a displacement angle greater than 90° opposite to the clockwise direction in relation to the rotational movement of the twine holding disk in the rotational direction about the twine holding disk axis.

9. The twine knotter according to claim 8, wherein the first pair of at least two first recesses and the second pair of at least two second recesses are arranged displaced relative to each other by 180° at the outer contour of the twine holding disk.

10. The twine knotter according to claim 1, wherein the knotter disk comprises two of said second drive means, said second drive means each formed as a tooth segment.

11. The twine knotter according to claim 1, wherein the knotter hook comprises a gap.

12. A bale press comprising a plurality of twine knotters, wherein the twine knotters each are the twine knotter according to claim 1.

13. A method for forming two sequential knots for holding together a tying agent surrounding a crop bale, using the twine knotter according to claim 1, the method comprising:
cutting through the tying agent strands of the tying agent between a first one of the two sequential knots and a second one of the two sequential knots by rotating the twine holding disc past the knife blade; and
stopping the twine holding disk prior to completion of the second one of the two sequential knots before the tying agent strands held in the holding arrangement pass the knife blade.

* * * * *